United States Patent
Fujiwara

(10) Patent No.: US 10,286,883 B2
(45) Date of Patent: May 14, 2019

(54) MOTOR-DRIVEN TRAVELING DEVICE

(71) Applicant: Sharp Kabushiki Kaisha, Sakai, Osaka (JP)

(72) Inventor: Yoichi Fujiwara, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 194 days.

(21) Appl. No.: 15/498,819

(22) Filed: Apr. 27, 2017

(65) Prior Publication Data

US 2017/0327093 A1 Nov. 16, 2017

(30) Foreign Application Priority Data

May 10, 2016 (JP) .................. 2016-094613
Mar. 14, 2017 (JP) .................. 2017-048620

(51) Int. Cl.
| | |
|---|---|
| *B60T 7/08* | (2006.01) |
| *B60T 13/74* | (2006.01) |
| *B60L 7/08* | (2006.01) |
| *B60L 7/00* | (2006.01) |
| *B60L 7/02* | (2006.01) |
| *B60L 7/04* | (2006.01) |
| *B60L 7/24* | (2006.01) |
| *F16D 121/20* | (2012.01) |

(52) U.S. Cl.
CPC .............. *B60T 7/085* (2013.01); *B60L 7/003* (2013.01); *B60L 7/02* (2013.01); *B60L 7/04* (2013.01); *B60L 7/08* (2013.01); *B60L 7/24* (2013.01); *B60T 13/748* (2013.01); *B60L 2220/16* (2013.01); *B60L 2220/42* (2013.01); *B60L 2220/46* (2013.01); *F16D 2121/20* (2013.01); *Y02T 10/646* (2013.01)

(58) Field of Classification Search
CPC . B60T 7/085; B60L 7/003; B60L 7/24; B60L 7/08; B60L 7/04; B60L 7/02
See application file for complete search history.

(56) References Cited

U.S. PATENT DOCUMENTS

| | | | | |
|---|---|---|---|---|
| 1,837,384 | A * | 12/1931 | Warner | .................. B60T 13/74 188/106 A |
| 7,513,334 | B2 * | 4/2009 | Calver | ................ B66D 1/7415 182/133 |
| 9,586,563 | B2 * | 3/2017 | Kanai | ...................... B60T 7/08 |

(Continued)

FOREIGN PATENT DOCUMENTS

| | | |
|---|---|---|
| JP | 2001-346400 A | 12/2001 |
| JP | 2006-263894 A | 10/2006 |

*Primary Examiner* — Faye M Fleming
(74) *Attorney, Agent, or Firm* — Keating & Bennett, LLP

(57) ABSTRACT

The present invention provides a motor-driven traveling device including: a vehicle body; a motor for travel driving that is capable of braking the vehicle body as a short brake or a dynamic brake; an electromagnetic brake that brakes the vehicle body, separately from the motor; an operation switching circuit that switches between causing the motor to perform travel driving and causing the motor to perform braking; a brake release switch that receives an operation pertaining to brake releasing of the motor and the electromagnetic brake; and a brake control circuit that, while the brake release switch is operated, controls the motor and the electromagnetic brake in response to the operation on the brake release switch.

14 Claims, 15 Drawing Sheets

(56) References Cited

U.S. PATENT DOCUMENTS

| | | | |
|---|---|---|---|
| 10,153,715 B2* | 12/2018 | Aoki | .......................... H02P 6/15 |
| 2002/0017882 A1 | 2/2002 | Shimogama | |
| 2018/0222528 A1* | 8/2018 | Jagenstedt | ........... A01D 34/008 |

* cited by examiner

MOTOR-DRIVEN TRAVELING DEVICE

CROSS-REFERENCE TO RELATED APPLICATION

This application is related to Japanese Patent Application No. 2016-94613 which are filed on May 10, 2016 and No. 2017-48620 filed on Mar. 14, 2017, whose priorities are claimed and the disclosure of which are incorporated by reference in their entirety.

BACKGROUND OF THE INVENTION

1. Field of the Invention

The present invention relates to a motor-driven traveling device, and more particularly to a motor-driven traveling device that can safely release a brake by suppressing an unexpected movement of a vehicle body, when the brake is released by energizing an electromagnetic brake.

2. Description of the Related Art

An autonomous traveling device or a robot device is designed so that persons around the device are prevented from being exposed to danger due to an unexpected movement of a vehicle body, an arm, etc., when a power supply is turned off and a motor serving as a drive source is deactivated. Specifically, there has been known a device including an electromagnetic brake which applies a brake when a power supply for driving is turned off. While the power supply for driving is turned on, a motor is activated and the brake by the electromagnetic brake is released (for example, see Japanese Unexamined Patent Publication No. 2001-346400 and Japanese Unexamined Patent Publication No. 2006-263894).

SUMMARY OF THE INVENTION

Whether it is an autonomous traveling device or a traveling device operated by a person, a motor-driven traveling device may be stopped by an electromagnetic brake which is activated for safety when a motor is stopped due to a failure or a small battery residual quantity, for example. A user may hope to move the traveling device, which is under this condition, by pushing by hands to the side of a traveling road or a working space in some cases. However, when the user turns on the electromagnetic brake so that he/she moves the vehicle body by pushing by hands, the motor may rotate by a battery residual amount, by which the vehicle body may move to be likely to bring danger to users around the device.

It is considered that a circuit is configured for safety such that, when the electromagnetic brake is turned on to release a brake, the motor is simultaneously disconnected from the power supply. However, even with this configuration, if the electromagnetic brake is energized to release the brake by the depression of a switch on the vehicle body of the traveling device which is now stopped on a slope, for example, there is a possibility that the vehicle body moves toward the person pressing the switch near the vehicle body, and this is dangerous. It is more dangerous if the vehicle body has a weight larger than the body weight of a person. Due to an unexpected movement of the vehicle body, a person around the device may fall or may be caught to be at a risk of being damaged.

The present invention is accomplished in view of the above circumstances, and provides a motor-driven traveling device that can safely release a brake by suppressing an unexpected movement of a vehicle body.

The present invention provides a motor-driven traveling device including: a vehicle body; a motor for travel driving that is capable of braking the vehicle body as a short brake or a dynamic brake; an electromagnetic brake that brakes the vehicle body, separately from the motor; an operation switching circuit that switches between causing the motor to perform travel driving and causing the motor to perform braking; a brake release switch that receives an operation pertaining to brake releasing of the motor and the electromagnetic brake; and a brake control circuit that, while the brake release switch is operated, controls the motor and the electromagnetic brake in response to the operation on the brake release switch.

In the motor-driven traveling device according to the present invention, while the brake release switch is operated, the brake control circuit controls the motor and the electromagnetic brake in response to the operation on the brake release switch, whereby a user can safely release a brake by suppressing an unexpected movement of the vehicle body upon releasing the electromagnetic brake.

DESCRIPTION OF THE PREFERRED EMBODIMENTS

Hereinafter, the present invention will be described in more detail with reference to the drawings. Note that the description below is illustrative in all aspects, and should not be construed to limit the present invention.

First Embodiment

<<Autonomous Vehicle as Motor-Driven Traveling Device>>

Figure 1:
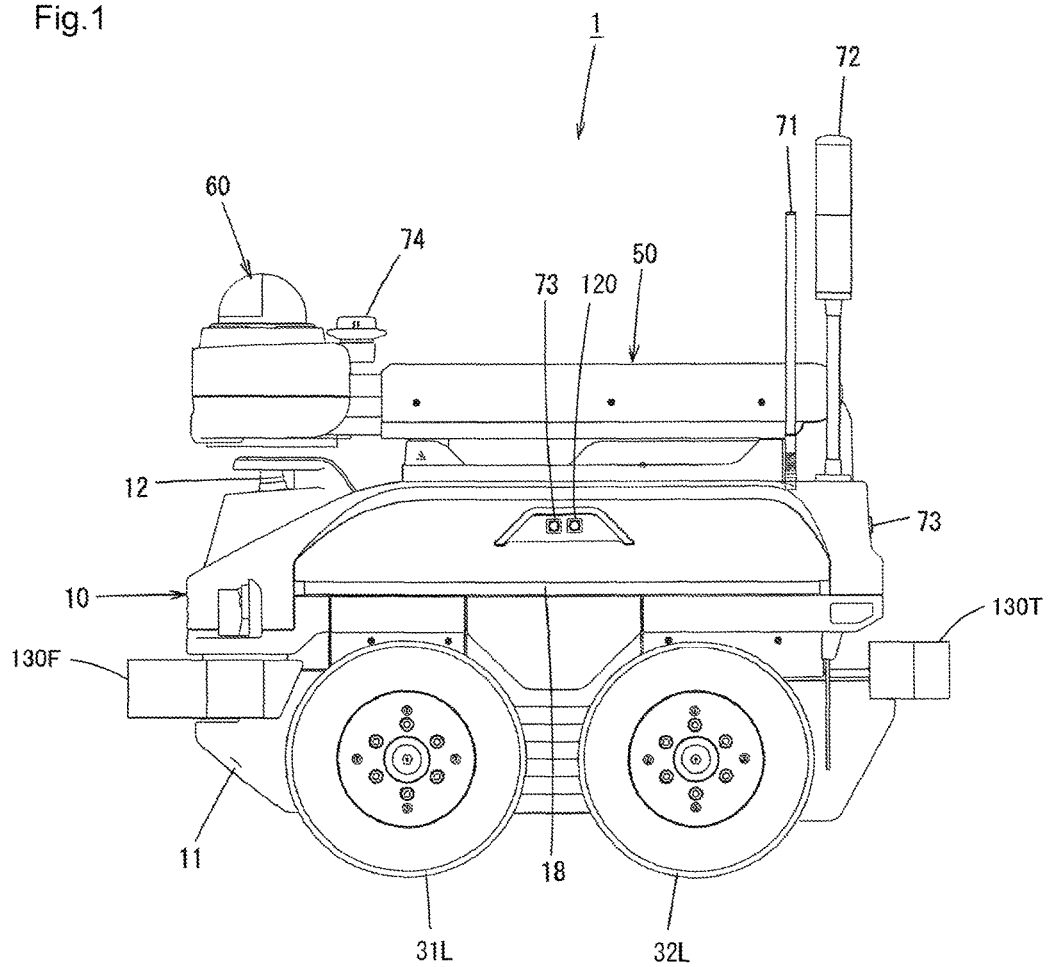
FIG. 1 is a side view illustrating an external appearance of an autonomous vehicle which is one embodiment of a motor-driven traveling device according to the present invention.
Figure 2:
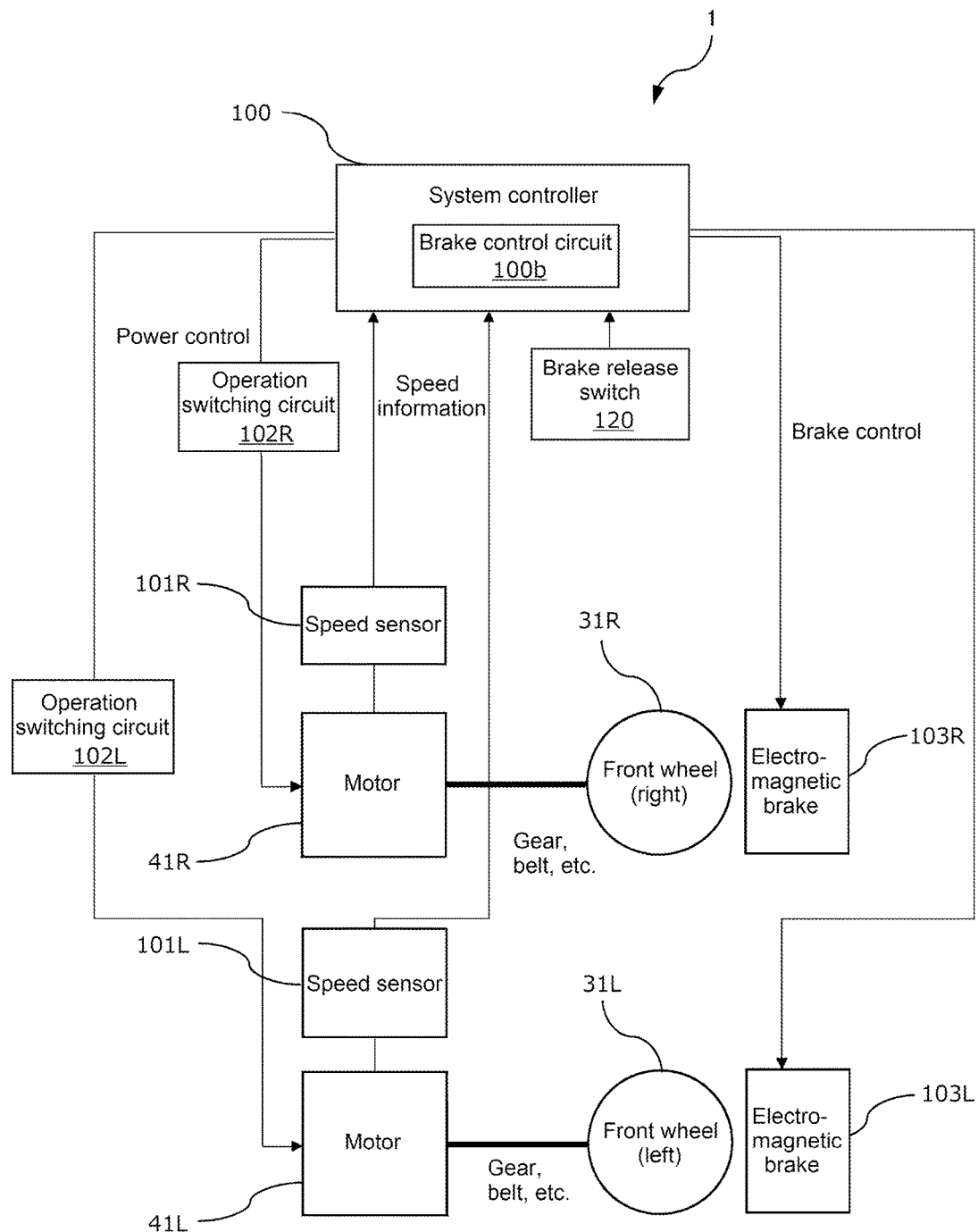
FIG. 2 is a block diagram illustrating the schematic configuration of the autonomous vehicle illustrated in FIG. 1.

FIG. 1 is a side view illustrating an external appearance of an autonomous vehicle which is one embodiment of the motor-driven traveling device according to the present invention. FIG. 2 is a block diagram illustrating the schematic configuration of the autonomous vehicle illustrated in FIG. 1.

As illustrated in FIG. 1, an autonomous vehicle 1 mainly includes an electric chassis 10, a cover 18 and a lifting and lowering mechanism 50 which are provided on the electric chassis 10, and a surveillance camera 60 mounted on the tip of the lifting and lowering mechanism 50 as an imaging unit. The autonomous vehicle 1 also includes a front bumper 130F and a rear bumper 130T.

A distance detection unit 12 is mounted on the front end of the electric chassis 10, and a Wi-Fi antenna 71 and a warning light 72 are mounted on the rear end of the electric chassis 10. CCD cameras 73 are mounted on left and right side surfaces and front and rear surface of the electric chassis 10. A GPS antenna 74 is provided at the back of the surveillance camera 60 on the tip of the lifting and lowering mechanism 50. In addition, a brake release switch 120 is provided near the CCD camera 73 on the side surface.

The distance detection unit 12 has a function of confirming a front region in a traveling direction and a state of a road surface, and includes a light-emitting unit that emits light, a light-receiving unit that receives light, and a scanning control unit that scans an emission direction of light so that the light is emitted to a plurality of predetermined measured points in the space ahead.

LIDAR (Light Detection and Ranging or Laser Imaging Detection and Ranging) that measures distances at a plurality of measured points in a predetermined distance measurement region by emitting laser to a two-dimensional space or a three-dimensional space in the distance measurement region can be employed for the distance detection unit 12.

The electric chassis 10 includes a chassis body 11, and four wheels (including front wheels 31L and 31R illustrated in FIG. 1 and a rear wheel 32L illustrated in FIG. 2) mounted on front, rear, left, and right of the electric chassis body 11. The electric chassis 10 also includes two motors 41L and 41R (see FIG. 2) that independently drive the rotations of a pair of left and right front wheels 31L and 31R, a battery 40 (not illustrated in FIGS. 1 and 2) that supplies electric power to these motors 41L and 41R, the distance detection unit 12, and a system controller 100 (see FIG. 2).

The system controller 100 is a section implementing a traveling function, a surveillance function, or the like of the autonomous vehicle 1, and includes, as hardware resources, a CPU as a core, and a memory, an input/output interface circuit, a timer circuit, a communication interface circuit, and the like.

The system controller 100 encompasses a function of a brake control circuit 100b according to the present invention. The brake control circuit 100b controls an operation switching circuit 102L and an operation switching circuit 102R.

The autonomous vehicle 1 is configured to preliminarily store map information and moving route information of a region where the autonomous vehicle 1 is to travel, and to travel on a predetermined route, while avoiding an obstacle, by utilizing information acquired from the surveillance camera 60, the distance detection unit 12, and GPS (Global Positioning System).

While traveling, the autonomous vehicle 1 recognizes a posture of a person issuing an instruction by particularly utilizing the surveillance camera 60, the distance detection unit 12, or the like, and autonomously travels while recognizing the condition ahead of the electric chassis 10 in the traveling direction on the basis of the instruction previously associated with the posture. For example, when detecting that there is an obstacle or a step ahead, the autonomous vehicle 1 stops, turns, moves backward, or moves forward to change its course, and executes a function corresponding to the instruction, in order to prevent the collision against the obstacle.

Speed sensors 101L and 101R measure the rotational speed and the rotational direction of the motors 41L and 41R, respectively, and transmit the measurement results to the system controller 100 as speed information. Note that, if the vehicle body moves by external force with electromagnetic brakes 103L and 103R being released, shafts of the motors 41L and 41R rotate with the rotation of drive wheels. The speed sensors 101L and 101R detect the speed and direction of the vehicle body which moves due to external force.

The system controller 100 converts the rotational speed of the motors 41L and 41R into a traveling speed of the autonomous vehicle 1 on the basis of the diameters of the front wheels 31L and 31R serving as drive wheels and a reduction gear ratio of a drive system. Then, the system controller 100 controls the traveling of the autonomous vehicle 1 by power control or brake control.

In the autonomous vehicle 1 illustrated in FIG. 1, as one example, the total length of the vehicle body is about 1.4 meters, the entire width is about 0.85 meter, the diameter of each wheel is about 0.4 meter, the weight of the vehicle body is about 200 kilograms, and the rated output of each of the motors 41L and 41R is 400 watts.

<<Configuration Pertaining to Brake Releasing>>

Next, brake releasing of the autonomous vehicle 1 will be described.

Figure 3:
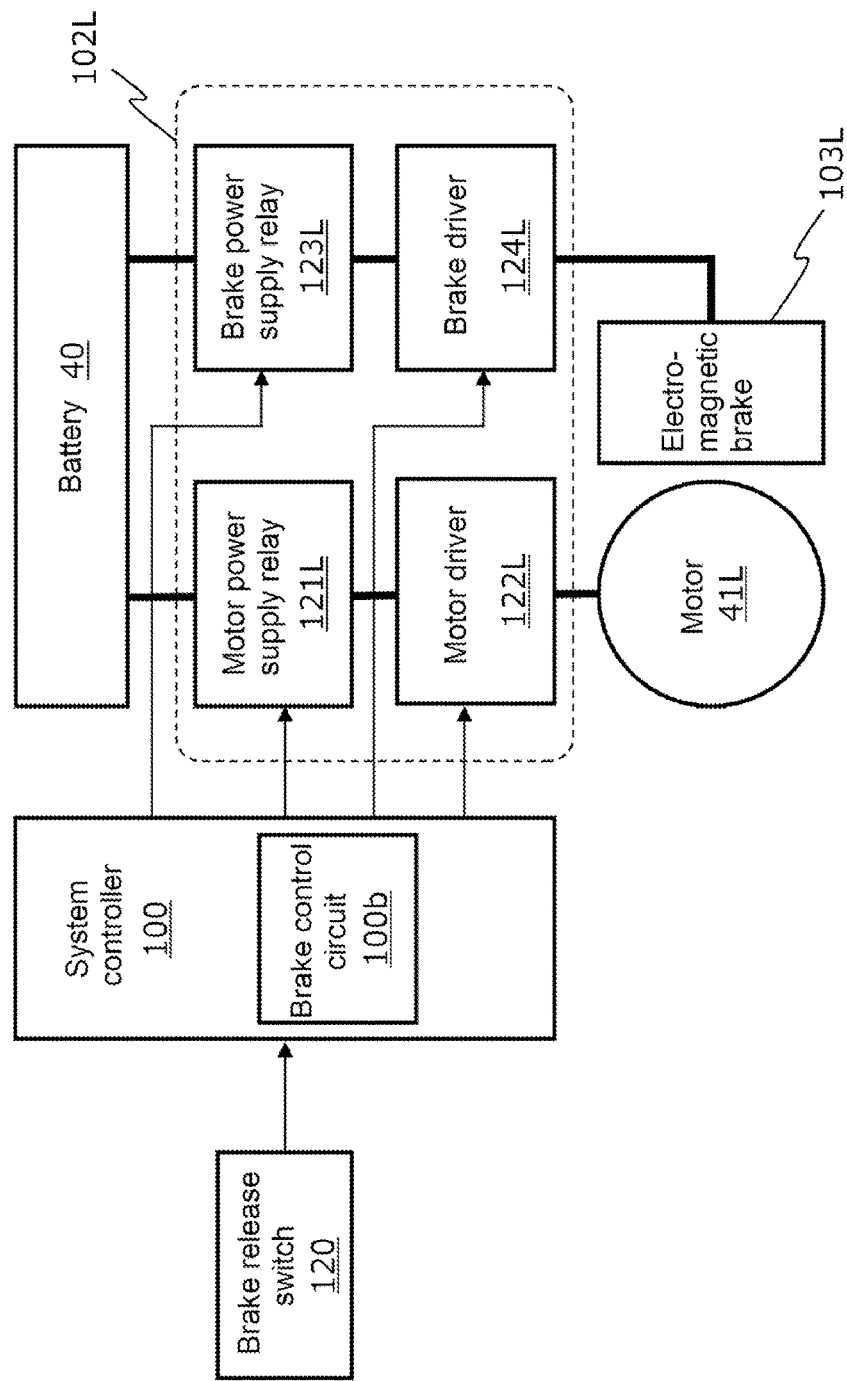
FIG. 3 is a block diagram illustrating the detail of a configuration pertaining to brake releasing in the autonomous vehicle illustrated in FIG. 2.

FIG. 3 is a block diagram illustrating the detail of a configuration pertaining to the brake releasing of the autonomous vehicle 1 illustrated in FIG. 2. While the front wheels, the motors, the operation switching circuits, the electromagnetic brakes, and the like respectively form a left-right pair in FIG. 2, FIG. 3 representatively illustrates the left components in the pairs of the components. The right components which are not illustrated are similar to the corresponding left components. Similarly, FIGS. 9 and 13 also representatively illustrate only the left components.

It is considered that not only an autonomous traveling device but also a motor-driven traveling device operated by a person is provided with an electromagnetic brake as described above, wherein a brake is released by a brake release switch to push the device by hands.

As illustrated in FIG. 3, the motor 41L is connected to the battery 40 through a motor power supply relay 121L and a motor driver 122L. The electromagnetic brake 103L is connected to the battery 40 through a brake power supply relay 123L and a brake driver 124L.

The brake control circuit 100b controls operations, pertaining to brake releasing, of the motor power supply relay 121L, the motor driver 122L, the brake power supply relay 123L, and the brake driver 124L.

The brake release switch 120 is a switch operated by a user for releasing the brake in a state in which the autonomous vehicle 1 is stopped due to activating the electromagnetic brake 103L.

The brake release switch 120 in FIG. 3 is a multistage switch. The multistage switch herein is supposed to be a mechanism used for a shutter button of a camera. A shutter button of a camera is generally configured such that, when being slightly pressed, focus is fixed, and when being released, the fixed focus is released. When the shutter button is further pressed with the focus being fixed, the shutter is activated.

The multistage switch indicates a switch which can be set in a plurality of stages according to an operation amount. However, the multistage switch is not limited to a push switch such as a shutter button. For example, other types of switches such as a rotary switch or a lever switch may be used. Notably, it is extremely preferable that, from the viewpoint of safety, the multistage switch in the present embodiment is a self-reset switch which is reversibly returned to an original state when an operation thereto is stopped. Hereinafter, a push switch will be described as a representative example.

Figure 4:
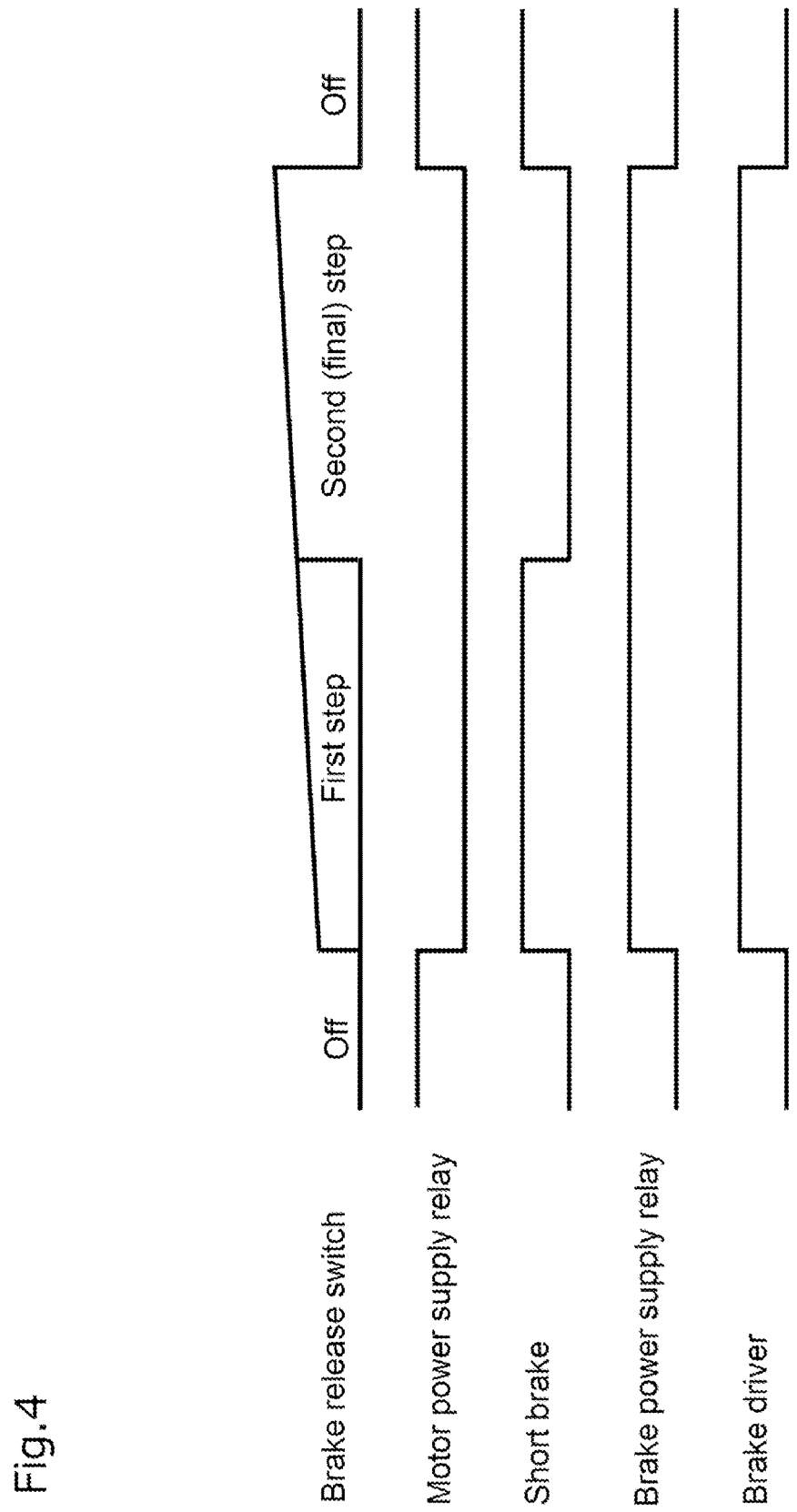
FIG. 4 is an explanatory view illustrating an operation for releasing a brake by a system controller in response to an operation on a brake release switch illustrated in FIG. 3.

FIG. 4 is an explanatory view illustrating an operation for releasing the brake by the system controller 100 in response to an operation on the brake release switch 120 illustrated in FIG. 3. The brake release switch 120 is configured to receive two-step operation. Note that the vertical axis of the brake release switch in FIG. 4 indicates an operation amount. As illustrated in FIG. 4, when the brake release switch which is in an off state is slightly pressed to receive the first step operation, the system controller 100 turns off the motor power supply relay 121L, in response to the operation, to disconnect the motor 41L and the motor driver 122L from the battery 40. The system controller 100 also controls the motor driver 122L so that a short brake is applied (short brake, which will be described later, is a method for causing the motor to function as a motor generator and applying a brake to the motor shaft). The system controller 100 also turns on the brake power supply relay 123L and the brake driver 124L to energize the electromagnetic brake 103L, thereby releasing the electromagnetic brake which is currently being activated.

When the brake release switch 120 is further pressed from this state to receive the second step operation (final step), the system controller 100 controls the motor driver 122L so that the short brake is released.

From the viewpoint of the user who operates the brake release switch 120 for pushing the autonomous vehicle 1 by hands, at an initial step (first step) of slightly pressing the brake release switch 120 to start pushing the vehicle by hands, the short brake is applied, so that the vehicle body is hardly moved, although the electromagnetic brake 103L is released.

When the user further presses the brake release switch 120 to largely move the vehicle body from this state (second step operation), the short brake is released, so that the user can move the vehicle body with low power.

There may be a case in which the vehicle body unexpectedly moves with the own weight of the vehicle when the brake is released, such as a case in which the brake is released on a slope. In such a case, the user may push the vehicle by hands with the short brake being applied in the first step or by appropriately switching between braking by the short brake in the first step and releasing the brake in the second step, by operating the brake release switch 120. By operating the brake release switch 120, the user can prevent a person pushing the vehicle by hands or a person around the vehicle from being exposed to danger by suppressing acceleration of the vehicle body moving down the slope by its own weight.

On the other hand, when the autonomous vehicle 1 is pushed by hands for a long distance on a horizontal surface, the user presses the brake release switch 120 deeply (second step operation) to release the brake. Thus, the user can easily push the vehicle by hands.

As described above, the user can adjust the brake releasing by adjusting an operation amount of the brake release switch 120 according to conditions.

Since the multistage switch is used, an operation amount of the brake release switch 120 and braking force are in conjunction with each other, and therefore, the braking force is lowered in a stepwise manner. Thus, the user can adjust the braking force in an intuitive way.

<<With Regard to Motor Driver, Short Brake, and Dynamic Brake>>

Figure 5:
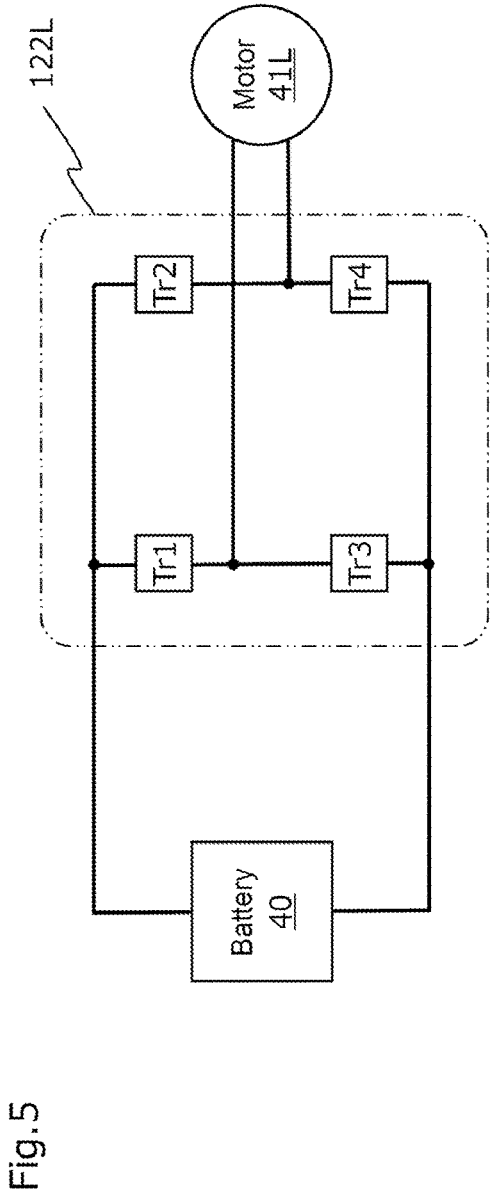
FIG. 5 is an explanatory view illustrating a basic configuration of a motor driver illustrated in FIG. 3 (in the case of using a DC brush motor)
Figure 6:
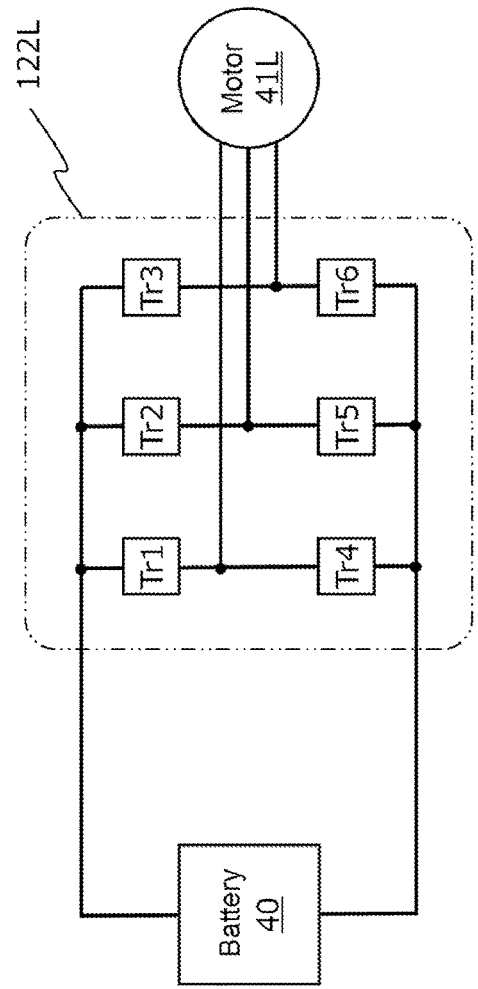
FIG. 6 is an explanatory view illustrating a basic configuration of a motor driver illustrated in FIG. 3 (in the case of using a DC brushless motor)

FIGS. 5 and 6 are explanatory views illustrating the basic configuration of the motor driver 122L.

FIG. 5 illustrates the configuration of a full-bridge circuit often used as a driver for a DC brush motor. FIG. 5 illustrates transistor elements Tr1 to Tr4 which function as switches. The system controller 100 controls on/off of each transistor element. For example, to rotate the motor 41L in a forward direction, the transistor elements Tr1 and Tr4 are turned on, and the transistor elements Tr2 and Tr3 are turned off. To rotate the motor 41L in the reverse direction, the transistor elements Tr1 and Tr4 are turned off, and the transistor elements Tr2 and Tr3 are turned on. Notably, the rotational speed of the motor 41L during the forward rotation can be controlled by turning on and off the transistor element Tr4 (or Tr1) in a cycle sufficiently shorter than a mechanical response time of the motor 41L and controlling the duty ratio (the ratio of an on-period in one cycle). This is a method called PWM (Pulse Width Modulation) control. During the reverse rotation, the transistor element Tr3 (or Tr2) is turned on and off.

FIG. 6 illustrates the configuration of a three-phase full-bridge circuit which is a driver configuration for a DC brushless motor. The system controller 100 controls on and off of six transistor elements Tr1 to Tr6 to cause the circuit to operate as an inverter circuit. A position (rotational angle) of a rotor of the motor 41L is detected using a Hall element or the like, and an on/off timing of each transistor element is determined by the system controller 100 on the basis of the detected rotor position.

The short brake by the motor will be described here. A short brake has been known as a method in which a motor is caused to function as a power generator to apply a brake to the motor shaft. When the motor functions as a power generator, terminals of the motor are externally short-circuited, so that short-circuit current flows through a winding circuit of the motor, and the motor consumes energy by itself. That is, the mechanical energy which rotates the motor shaft is converted into electric energy to be converted into heat for consumption. This is why this method is called a short brake.

There is a dynamic brake which is similar to a short brake. Different from the short brake in which motor terminals are externally short-circuited, in the dynamic brake, a resistor is connected between motor terminals, and energy is consumed by the resistor. Since the magnitude of current varies depending on the value of the resistor to be connected, braking force can be selected by selecting a resistance value. Note that the braking force is lower in the dynamic brake than in the short brake, because current flowing through the circuit is reduced by the resistance value in the dynamic brake.

Figure 7A:
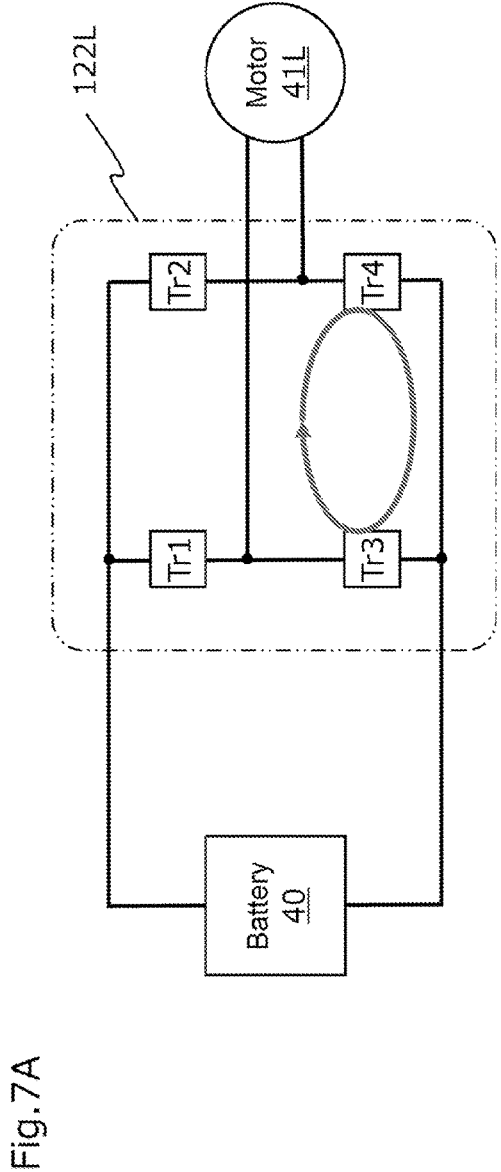
FIG. 7A is an explanatory view illustrating a state in which the motor driver illustrated in FIG. 5 applies a short brake.
Figure 7B:
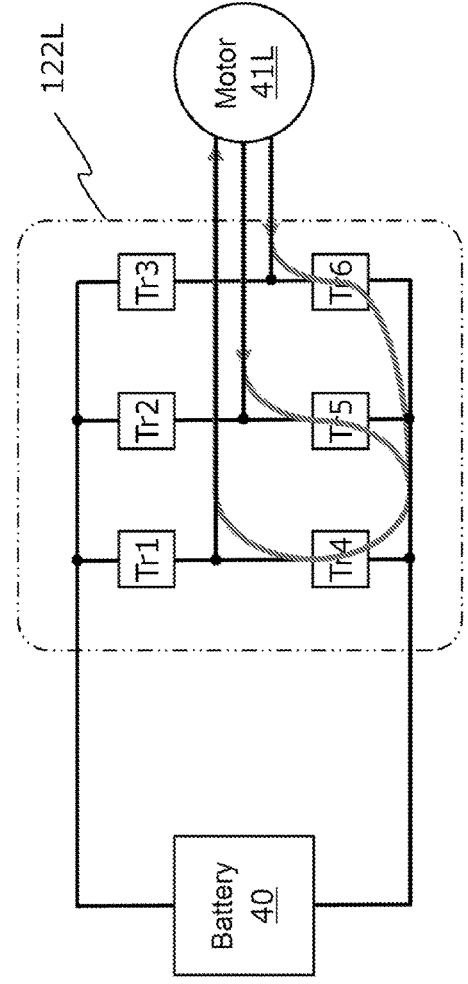
FIG. 7B is an explanatory view illustrating a state in which the motor driver illustrated in FIG. 6 applies a short brake.

FIGS. 7A and 7B are explanatory views illustrating control of the motor driver to apply a short brake. FIG. 7A corresponds to FIG. 5, and illustrates a short brake using a DC brush motor. FIG. 7B corresponds to FIG. 6, and illustrates a short brake using a DC brushless motor.

As illustrated in FIG. 7A, in the case of using the DC brush motor, the system controller 100 turns off the transistor elements Tr1 and Tr2, and turns on the transistor elements Tr3 and Tr4. Short-circuit current flows through windings of the motor 41L and the transistor elements Tr3 and Tr4 so that electric power generated from the motor 41L is consumed by the motor 41L, and braking force is applied to the motor 41L, which makes the motor shaft difficult to rotate.

When the transistor element Tr3 (or Tr4) is turned on and off in a cycle sufficiently shorter than the mechanical response time of the motor 41L and the duty ratio thereof is controlled, the average (time average) of the short-circuit current varies, so that braking force varies. This corresponds to varying a resistance value in the dynamic brake.

As illustrated in FIG. 7B, in the case of using the DC brushless motor, the system controller 100 turns off the transistor elements Tr1, Tr2, and Tr3. The system controller 100 then turns on the transistor elements Tr4, Tr5, and Tr6 according to a rotor position. Thus, short-circuit current flows through the windings of the motor 41L and any of the transistor elements Tr4, Tr5, and Tr6 (any two of the transistor elements according to the rotor position), and therefore, energy is consumed by the motor 41L, which makes the motor 41L difficult to rotate.

When the transistor elements Tr4, Tr5, and Tr6 are turned on and off in a cycle sufficiently shorter than the mechanical response time of the motor 41L and the duty ratio thereof is controlled, the average of the short-circuit current varies, and therefore, the strength of the brake varies. This corresponds to varying a resistance value in the dynamic brake.

The short brake has been described above.

Figure 8A:
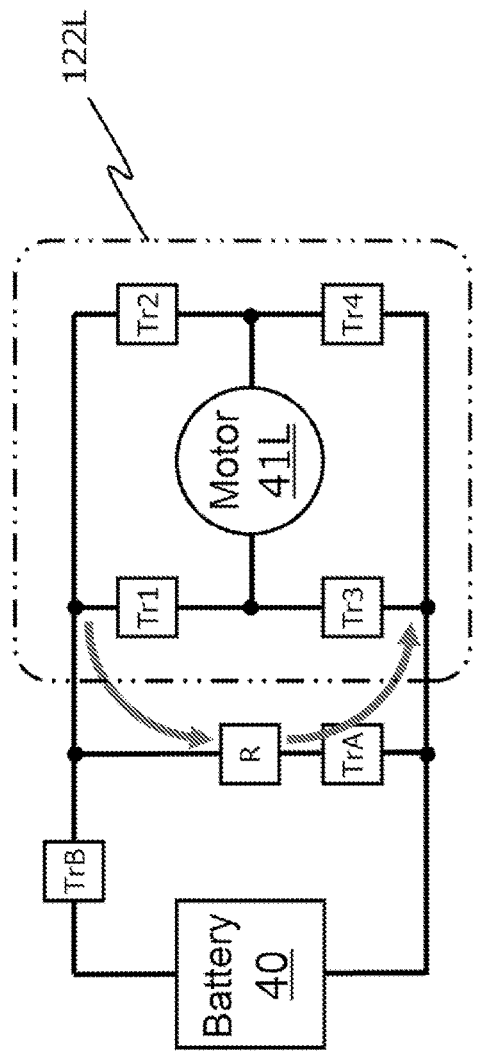
FIG. 8A is an explanatory view illustrating a state in which the motor driver illustrated in FIG. 5 applies a dynamic brake.
Figure 8B:
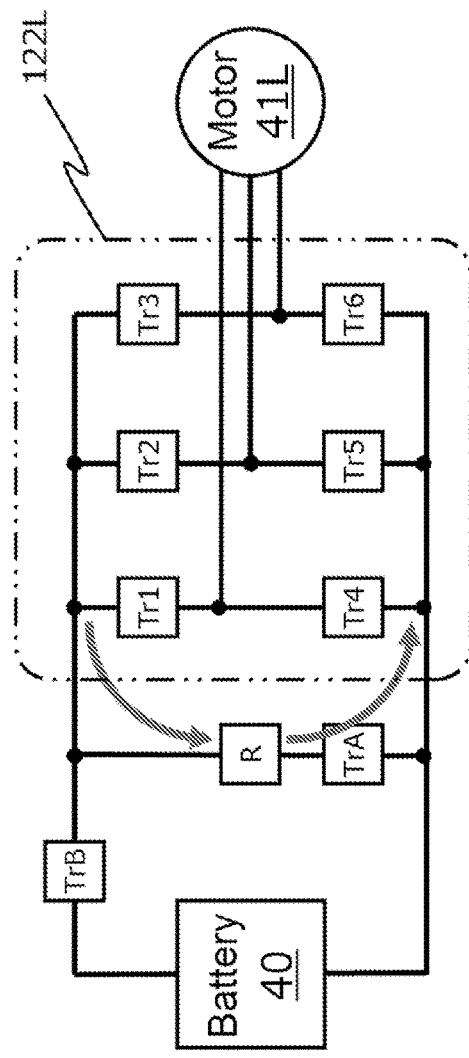
FIG. 8B is an explanatory view illustrating a state in which the motor driver illustrated in FIG. 6 applies a dynamic brake.

In the dynamic brake, while the motor 41L is driven, a switch TrB is turned on, and a switch TrA is turned off, to apply a voltage of the battery 40 to the terminals of the motor 41L, as illustrated in FIGS. 8A and 8B. On the other hand, a resistor R, which consumes electric power generated from the motor 41L while the brake is activated, is inserted between the terminals of the motor 41L. Specifically, the switch TrA is turned on to allow current to flow through the resistor R, and the switch TrB is turned off to prevent the current from the battery 40 from flowing through the resistor R. Thus, the energy generated from the motor 41L is consumed by the resistor R, so that a brake is applied to the motor shaft.

Second Embodiment

In the first embodiment, the brake release switch 120 is described as a multistage switch that receives two-step operation. However, the brake release switch 120 is not limited thereto, and may be a multistage switch that detects operation amounts of at least three steps. The system controller 100 may control such that braking force by the motor is lowered, as the operation amount proceeds to the next step from the first step.

Figure 9:
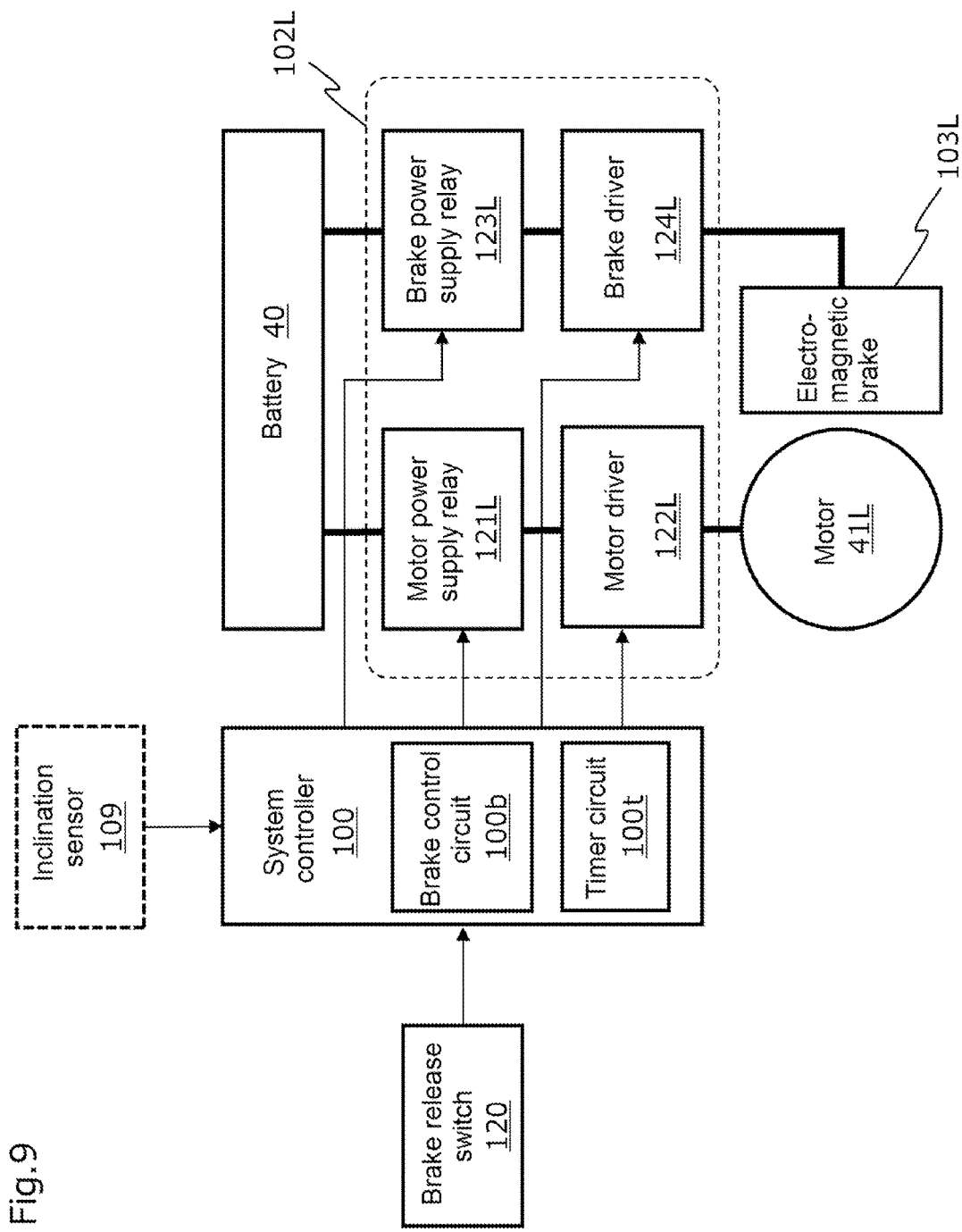
FIG. 9 is a block diagram illustrating an example of a configuration, different from FIG. 3, pertaining to brake releasing of the autonomous vehicle illustrated in FIG. 2.

FIG. 9 is a block diagram illustrating an example of a configuration, different from FIG. 3, pertaining to brake releasing of an autonomous vehicle 1 illustrated in FIG. 2. The different feature from FIG. 3 is that the system controller 100 includes a timer circuit 100t. The timer circuit 100t is used to control a duty ratio of a transistor element in a short brake.

In addition, the configuration in FIG. 9 has an inclination sensor 109 which is not included in the configuration in FIG. 3. It should be noted that the inclination sensor 109 is not an essential component in the present embodiment. An embodiment using the inclination sensor 109 will be described in a fifth embodiment.

Figure 10:
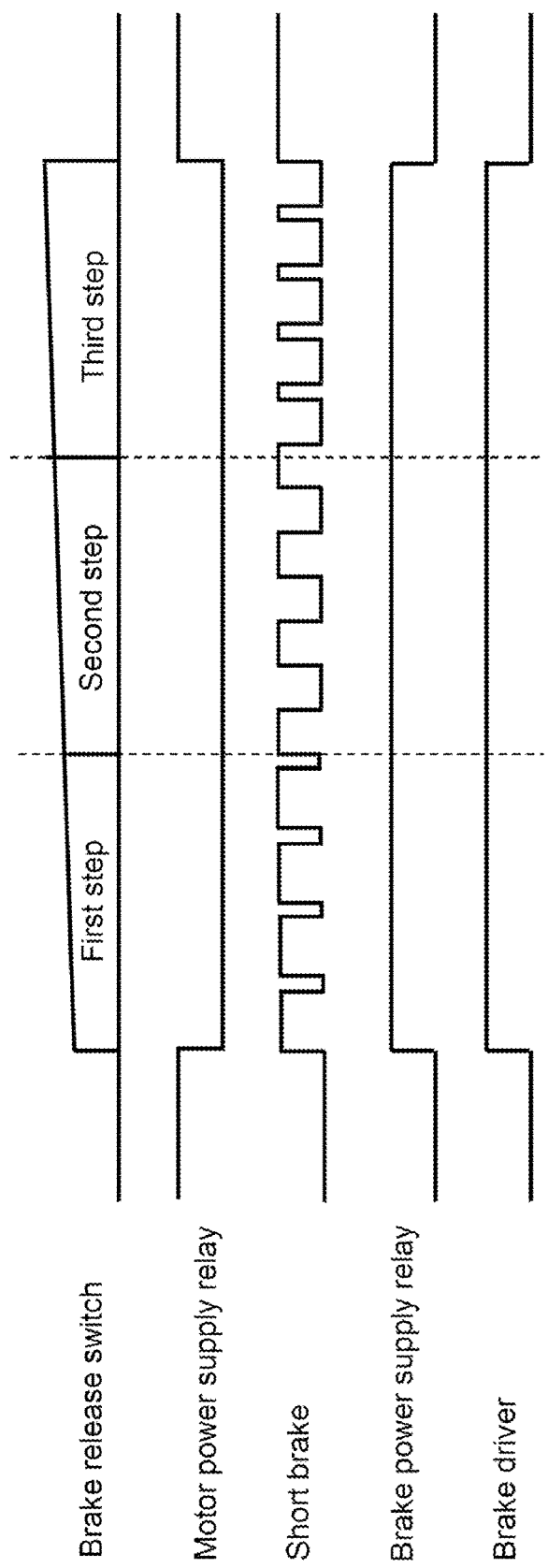
FIG. 10 is an explanatory view illustrating an operation for releasing a brake by a system controller in response to an operation on a brake release switch illustrated in FIG. 9 (second embodiment)

FIG. 10 is an explanatory view illustrating an operation for releasing a brake by the system controller 100 in response to an operation on a brake release switch 120 illustrated in FIG. 9. Different from FIG. 4, the system controller 100 in FIG. 10 turns on and off transistor elements in a short cycle during the application of the short brake, and varies an on-off duty ratio according to an operation amount of the brake release switch 120. As the operation amount proceeds to the next step from the first step, the system controller 100 decreases the duty ratio (decreases the ratio of an on-period in one cycle) to gradually lower the braking force.

Third Embodiment

In the first and second embodiments, the brake release switch 120 is a multistage switch. However, it is considered that a general on-off switch is applied instead.

In the present embodiment, a brake release switch 120 itself is a simple switch which is brought into either one of an on-state and an off-state.

However, in the present embodiment, a system controller 100 measures the period (on period) in which the brake release switch 120 is pressed by using a timer circuit 100t. The system controller 100 then varies the duty ratio of the transistor element through which short-circuit current is to flow according to the length of the on period.

Figure 11:
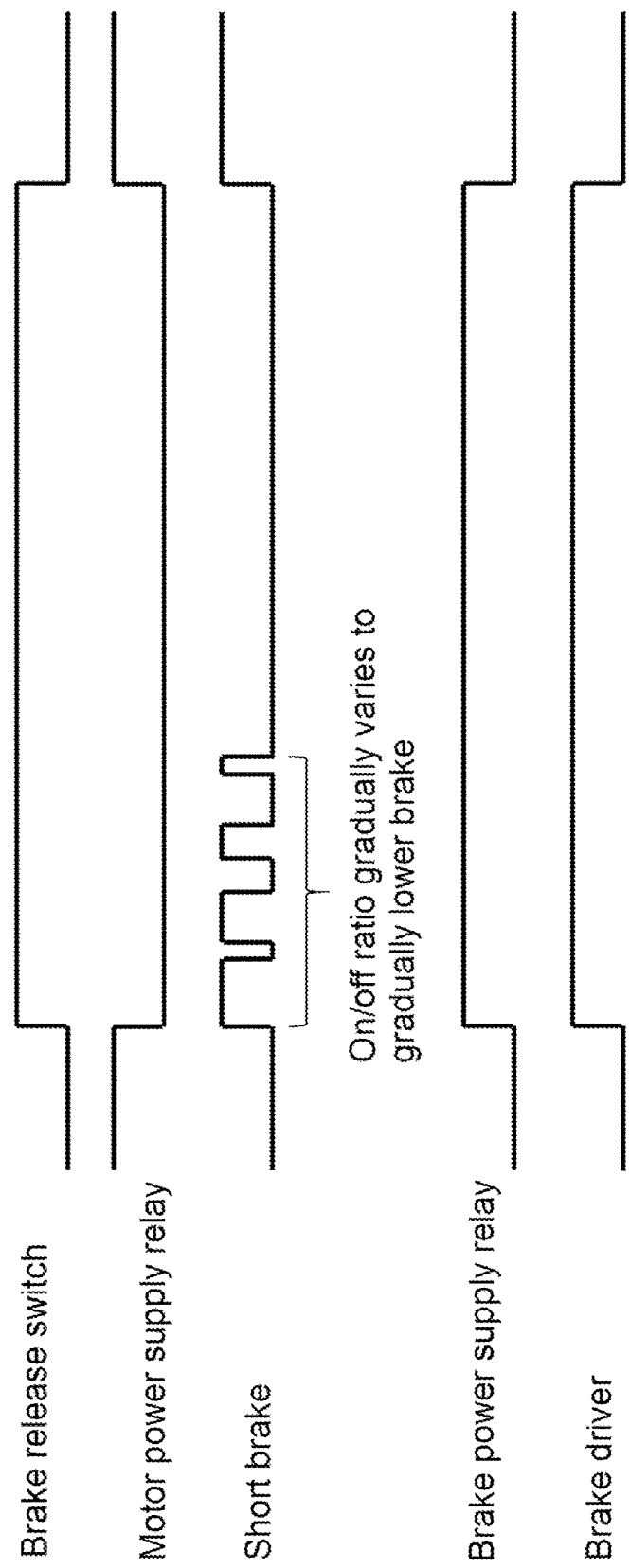
FIG. 11 is an explanatory view illustrating an operation for releasing a brake by a system controller in response to an operation on a brake release switch (third embodiment)

FIG. 11 is an explanatory view illustrating an operation for releasing a brake by the system controller 100 in response to the operation on the brake release switch 120. As illustrated in FIG. 11, the system controller 100 gradually, or in a stepwise manner, decreases the duty ratio of the transistor element through which short-circuit current is to flow to lower the braking force during the period in which the brake release switch 120 keeps in an on state. According to this control, just after the brake release switch 120 is pressed, a user needs large power to move the vehicle body by hands. However, as the on period of the brake release switch 120 is continued, the user becomes gradually capable of moving the vehicle body with less power. That is, with time, the user becomes gradually capable of moving the vehicle body by pushing the vehicle body by hands with constant power, thereby being capable of gradually accelerating and moving the vehicle body.

In addition, it may be configured such that, when the brake release switch 120 which is in an on state is turned off, the duty ratio of the transistor element is gradually increased to gradually strengthen the braking force.

Fourth Embodiment

The PWM control for lowering braking force with time described in the third embodiment may be combined to the multistage switch described in the first and second embodiments. By combining both aspects, braking force in multiple levels can be acquired according to an operation amount of the brake release switch 120, and further, as the operation amount proceeds to the next step (for example, from the first step to the second step and/or from the second step to the first step), the braking force can be gradually varied to smoothly accelerate or decelerate the vehicle body.

Fifth Embodiment

In the present embodiment, an inclination (the degree of inclination relative to a horizontal surface) of the vehicle body of the autonomous vehicle 1 in the traveling direction is measured by the inclination sensor 109 illustrated in FIG. 9, and braking force in a short brake is corrected according to the level of the inclination (degree of the inclination).

According to this embodiment, when a brake is released in order to push, by hands, the autonomous vehicle 1 which has been stopped on a slope, a system controller 100 sets a duty ratio for turning on a transistor element to be larger than that in a case in which the vehicle 1 is stopped on a horizontal surface, to thereby increase braking force in the short brake. Specifically, the duty ratio for turning on the transistor element (that is, the braking force in the short brake) is set to be larger in a case in which the vehicle is on the slope than in a case in which the vehicle is on the horizontal surface. This control can prevent the vehicle body from moving down the slope by its own weight.

According to this embodiment, the vehicle body, which is about to move down the slope with an increase in an inclination degree in the traveling direction, is suppressed with high braking force. Therefore, the brake can safely be released with an unexpected movement of the vehicle body being prevented.

Sixth Embodiment

In the autonomous vehicle 1 illustrated in FIG. 1, the brake release switch 120 is mounted on the side surface of the electric chassis 10. Instead of this configuration, the brake release switch 120 may be mounted on the front part and the rear part of the vehicle body.

Figure 12:
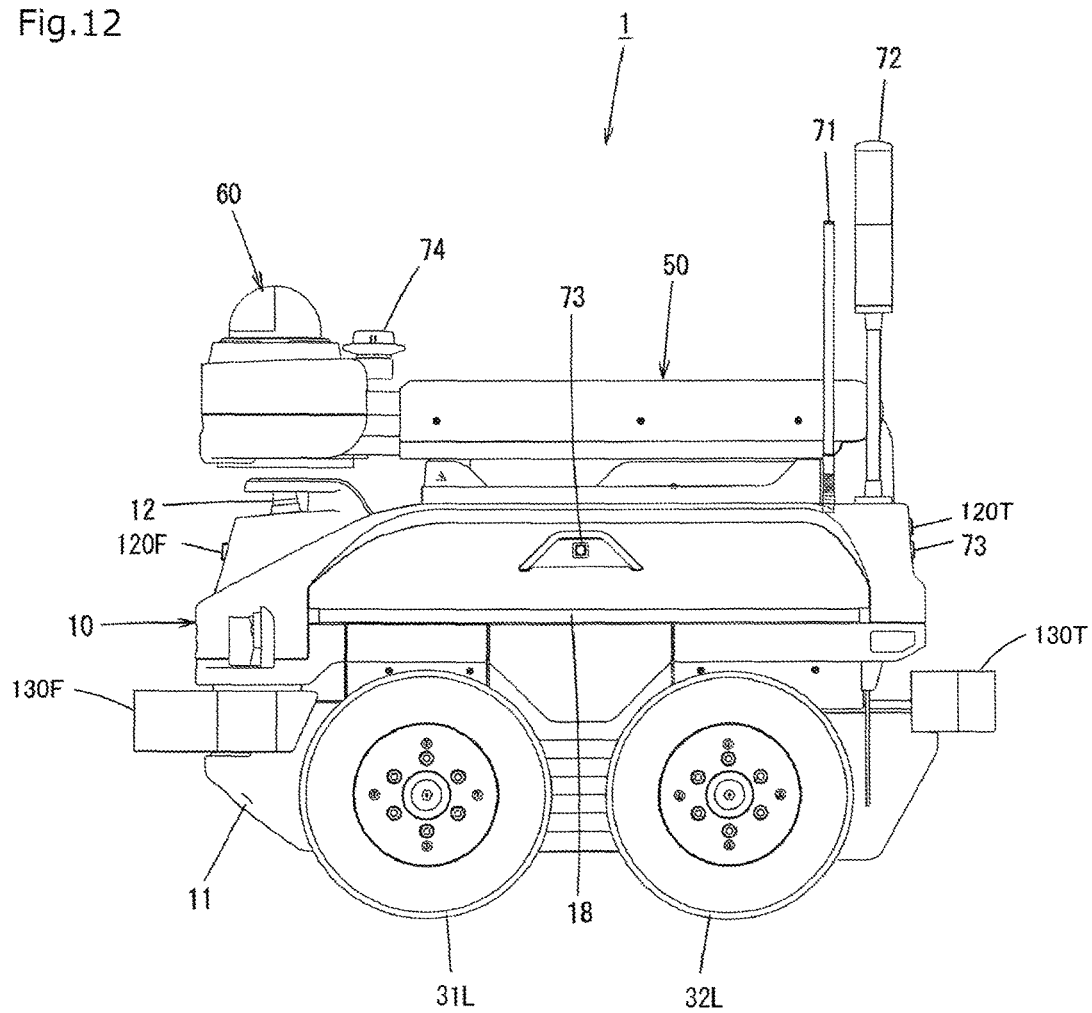
FIG. 12 is a side view illustrating an example in which, different from FIG. 1, brake release switches are provided on a front part and a rear part of the vehicle body (sixth embodiment)

FIG. 12 is a side view illustrating an external appearance of an autonomous vehicle, different from the autonomous vehicle 1 in FIG. 1, provided with a brake release switch 120F on the front part of the vehicle body and a brake release switch 120T on the rear part of the vehicle body. The autonomous vehicle 1 illustrated in FIG. 12 has the brake release switch 120F on the front part of the vehicle body and the brake release switch 120T having the same function as the brake release switch 120F on the rear part of the vehicle body.

According to this embodiment, to release a brake of the autonomous vehicle 1 stopping on a slope, a user can release the brake by operating one of two brake release switches 120F and 120T which is on the upper side of the slope. If the brake release switch 120 is mounted on only the front part or the rear part of the vehicle body, there may be a case in which the user has to go down the slope to perform an operation to release the brake. Such operation leads to a risk of a contact between the user and the vehicle body, because the vehicle is about to move down the slope by its own weight when the brake is released. This risk can be avoided by the configuration in which the brake release switch 120 is mounted on both the front part and the rear part, that is, on the opposite sides, of the vehicle body.

The vehicle body often stops while moving forward or backward. Therefore, in consideration of a case where the vehicle body stops on a slope, the brake release switch 120 is preferably mounted on the front part and the rear part of the vehicle body.

In addition, a brake control circuit 100b detects the rotational speed and the rotational direction of the front wheel 31L and the front wheel 31R, respectively, by the speed sensors 101L and 101R. If the front wheels 31L and 31R are about to rotate by external force with the brake being released, the brake control circuit 100b detects the start of the rotation by the speed sensors 101L and 101R, and controls the operation switching circuits 102L and 102R so that the motors 41L and 41R are braked.

Specifically, when the brake is released by operating the brake release switch 120F or 120T while the vehicle stops, and the front wheel 31L or 31R starts to rotate with the brake being released, the brake control circuit 100b allows the front wheel 31L or 31R to keep rotating if it rotates in an allowable rotational direction. However, if the front wheel 31L or 31R rotates in a direction in which the rotation should be inhibited, the brake control circuit 100b switches the operation switching circuits 102L and 102R to performing braking to inhibit the rotation of the front wheels 31L and 31R.

Herein, a designer sets in advance which direction is set as the direction in which the rotation of the front wheels 31L and 31R is allowed when the brake release switch 120F mounted on the front part of the vehicle body is operated: a direction in which the vehicle body moves forward; or a direction in which the vehicle body moves backward. Which direction is set is determined based on whether the user who operates the brake release switch 120 moves the autonomous vehicle 1 by pushing the vehicle body or by pulling the vehicle body.

Preferably, a handle is provided near the brake release switches 120F and 120T. If the handle is designed to have a shape and arrangement based on a presupposition that the user pushes the vehicle body, the rotational direction which is allowed when the brake release switch 120F on the front part of the vehicle body is operated is a direction in which the vehicle body moves backward, for example. Further, the rotational direction which is allowed when the brake release switch 120T on the rear part of the vehicle body is operated is a direction in which the vehicle body moves forward. The rotation in the direction opposite to these directions is inhibited.

On the other hand, if the handle is designed based on a presupposition that the user pulls the vehicle body, the rotational direction which is allowed when the brake release switch 120F on the front part of the vehicle body is operated is a direction in which the vehicle body moves forward, for example. Further, the rotational direction which is allowed when the brake release switch 120T on the rear part of the vehicle is operated is a direction in which the vehicle body moves backward. The rotation in the direction opposite to these directions are inhibited.

When the user releases the brake by operating the brake release switch 120T on the rear part of the vehicle body, i.e., on the bottom side of a slope, to try to move the autonomous vehicle 1, stopping on the slope while moving up the slope, by pushing the vehicle body from the bottom side toward the top side of the slope, the vehicle body is about to move backward down the slope by its own weight the moment the brake is released. If the vehicle 1 is left in this state, the user is at a risk of getting run over by the autonomous vehicle 1 that is moving backward.

According to the present embodiment, the brake control circuit 100b is set such that, when the brake release switch 120T is operated, the rotation of wheels in a direction by which the vehicle body moves forward is allowed, but the rotation of wheels in a direction by which the vehicle body moves backward is inhibited. Therefore, although the vehicle body slightly moves backward in the downward direction just after the brake is released, braking force by the motor is immediately applied. On the other hand, to move the vehicle body forward by pushing the vehicle body from the bottom side of the slope, the rotation of wheels in the direction by which the vehicle body moves forward is allowed, whereby the user can safely move the vehicle body by oneself.

On the other hand, when it is presupposed that the user pulls and moves the vehicle body, the brake control circuit 100b is set such that, when the brake release switch 120F on the front part of the vehicle body is operated, the rotation of wheels in a direction by which the vehicle body moves forward is allowed, but the rotation of wheels in a direction by which the vehicle body moves backward is inhibited.

Seventh Embodiment

The embodiment of using a multistage switch as the brake release switch 120 and the embodiment of using a single on-off switch is applied have been described. However, an embodiment of using a plurality of on-off switches instead of a multistage switch is considered.

The present embodiment describes a case in which an on-off switch is used corresponding to each step (first step and second step) in the operation in the first embodiment.

Figure 13:
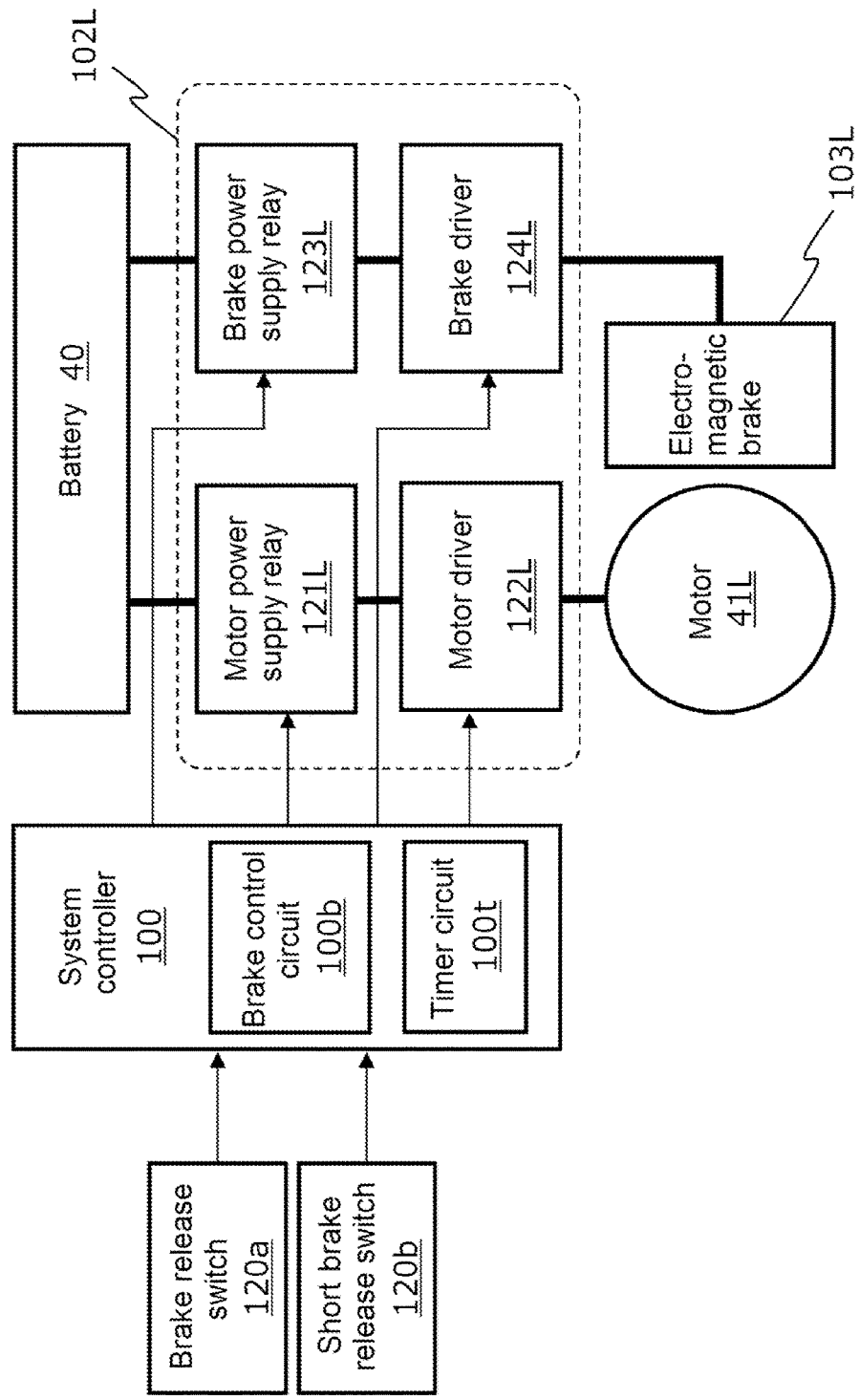
FIG. 13 is a block diagram illustrating the detail of a configuration pertaining to brake releasing in the autonomous vehicle illustrated in FIG. 2 (seventh embodiment)
Figure 14:
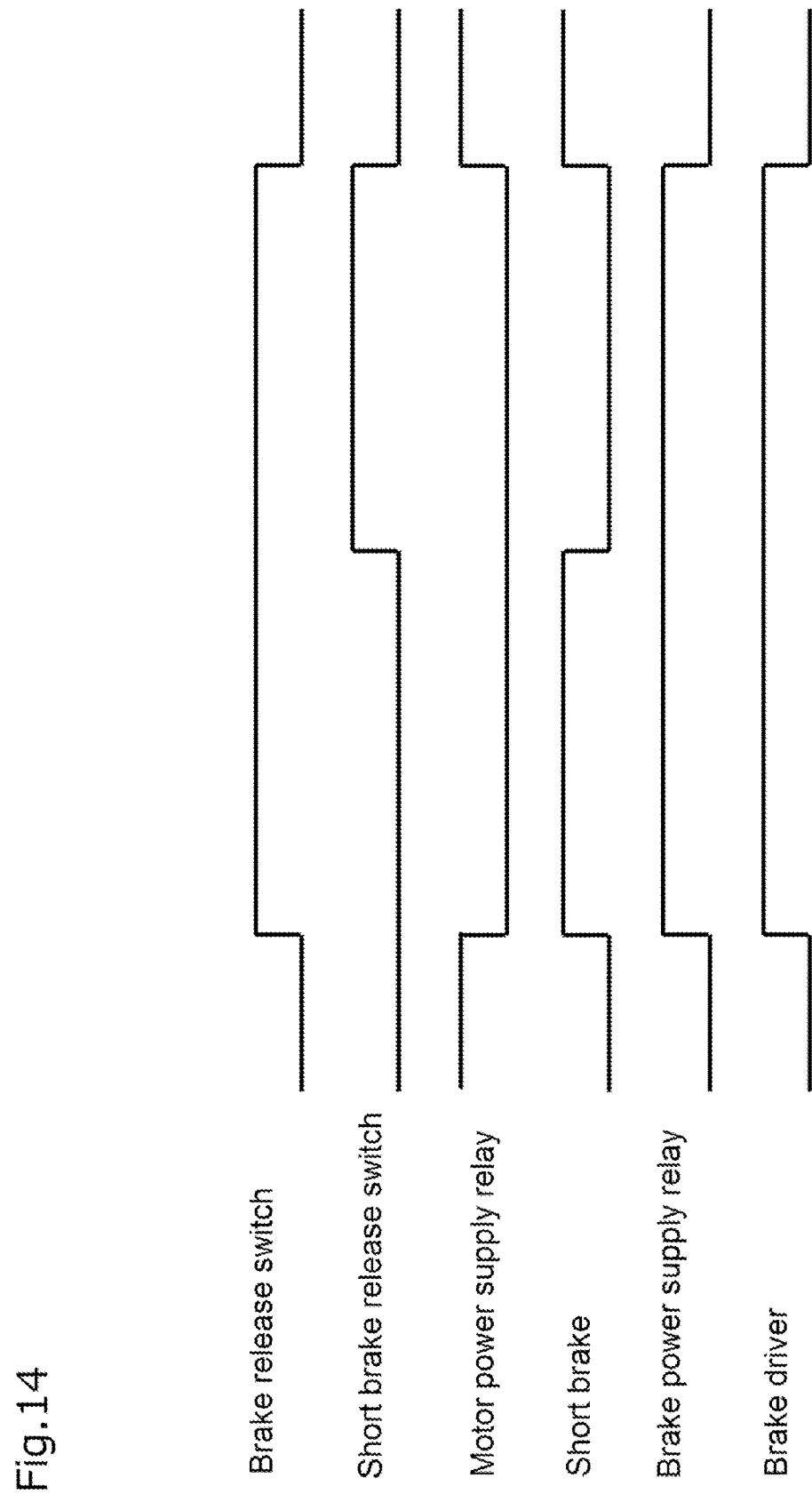
FIG. 14 is an explanatory view illustrating an operation for releasing a brake by a system controller in response to an operation on an electromagnetic brake release switch and a short brake release switch illustrated in FIG. 13.

FIG. 13 is a block diagram illustrating a configuration, different from the configurations in FIGS. 3 and 9, pertaining to brake releasing of the autonomous vehicle 1 illustrated in FIG. 2. FIG. 14 is an explanatory view illustrating an operation for releasing a brake by a system controller 100 in response to an operation on an electromagnetic brake release switch 120a and a short brake release switch 120b illustrated in FIG. 13.

In the present embodiment, the brake release switch 120 includes two on-off switches which are the electromagnetic brake release switch 120a and the short brake release switch 120b.

When only the electromagnetic release switch 120a is pressed, the system controller 100 releases the electromagnetic brake 103L with the short brake being applied.

When the short brake release switch 120b is also pressed, the system controller 100 releases the short brake.

However, when only the short brake release switch 120b is pressed, the system controller 100 does not do anything. That is, the system controller 100 does not release the electromagnetic brake 103L and the short brake. This is to prevent the user from being exposed to danger, even if he/she operates the brake release switch 120 in a false manner.

If a multistage switch is used for the brake release switch 120, the release state of the short brake is not recognizable by the user unless a specific display or the like is provided. Therefore, it is difficult for the user to recognize whether the vehicle body is in a state of being easily pushed by hands.

According to the present embodiment, the switches corresponding to respective steps of the operation are provided, whereby the user can easily recognize the brake release state. When the vehicle body is pushed by several persons by hands, it is preferable that each person can recognize the brake condition. This embodiment is considered to be suitable for such a situation.

The present embodiment describes the case adapted to a two-step multistage switch. However, if a multistage switch having steps more than two is used, switches corresponding in number to the respective steps may be provided. However, it is impractical if the number of switches to be operated is too large. Further, if braking force in the short brake is varied only from the second step to the final step as described in the second embodiment, a single multistage switch may be used for the short brake. Specifically, an on-off switch may be used for the electromagnetic brake release switch 120a, and a single multistage switch may be used for the short brake release switch 120b.

Eighth Embodiment

Figure 15:
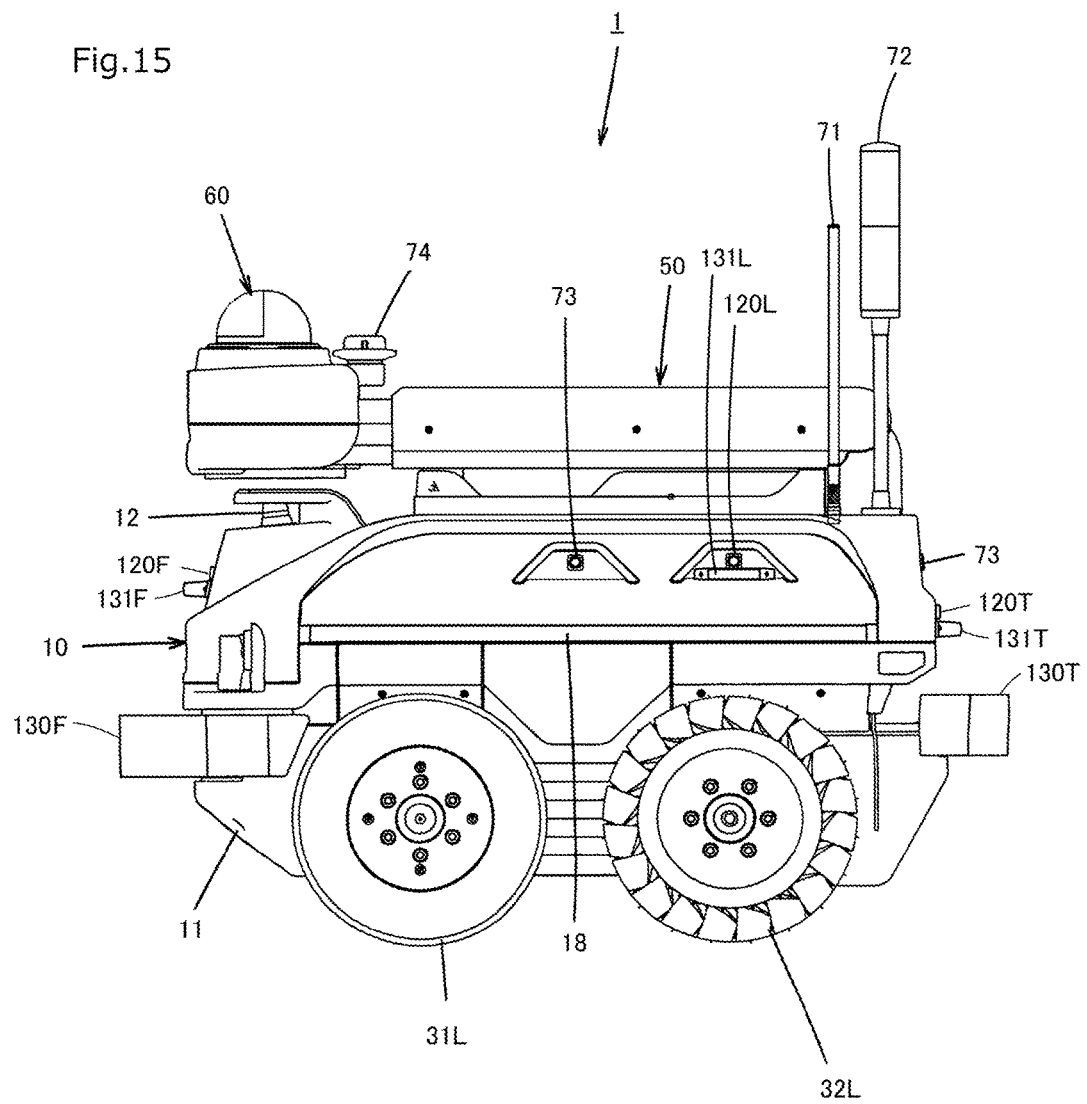
FIG. 15 is a left side view illustrating an embodiment of an autonomous vehicle, different from FIG. 1, according to the present invention.

FIG. 15 is a left side view illustrating an embodiment, different from FIG. 1, of an autonomous vehicle according to the present invention. In FIG. 15, the components corresponding to those in FIG. 1 are identified by the same reference marks in FIG. 1.

In FIG. 1, a wheel with tire is used for both the front wheel 31L and the rear wheel 32L of the autonomous vehicle. In contrast, in the autonomous vehicle 1 according to the present embodiment illustrated in FIG. 15, an omni wheel (registered trademark) is used for the rear wheel 32L. An omni wheel is similarly used for the unillustrated rear wheel 32R on the right side.

According to the configuration in which an omni wheel is used for the left and right rear wheels 32L and 32R, the left and right rear wheels 32L and 32R can be smoothly moved in the horizontal direction without rotating axels while turning. Therefore, when the left and right front wheels 31L and 31R which are wheels with tire are rotated in the opposite directions with the same rotational speed, the autonomous vehicle 1 illustrated in FIG. 15 can smoothly turn while stationary even with small torque with an intermediate point between the left front wheel 31L and the right front wheel 31R being defined as a rotation axis in a plan view.

The autonomous vehicle 1 can turn, while stationary, in a clockwise direction or in a counterclockwise direction by rotating the front wheels 31L and 31R in opposite directions, in addition to moving forward or backward by rotating the front wheels 31L and 31R in the same direction, by the motors 41L and 41R.

Notably, in the autonomous vehicle 1 illustrated in FIG. 15, a mecanum wheel (registered trademark) may be used, in place of an omni wheel, for left and right rear wheels 32L and 32R.

In addition, while the left and right front wheels 31L and 31R are drive wheels, the left and right rear wheels 32L and 32R are driven wheels, and the rear wheels are omni wheels in FIG. 15, the rear wheels 32L and 32R may be drive wheels and wheels with tire, and the front wheels 31L and 31R may be driven wheels and omni wheels.

As in FIG. 12, the autonomous vehicle 1 is provided with a brake release switch 120F on the front part of the vehicle body and a brake release switch 120T on the rear part of the vehicle body. The autonomous vehicle 1 is also provided with a brake release switch 120L on the left side surface of the vehicle body and a brake release switch 120R, not illustrated in FIG. 15, on the right side surface of the vehicle body.

The brake control circuit 100b detects the rotational speed and the rotational direction of the front wheel 31L and the front wheel 31R by the speed sensors 101L and 101R respectively. If the front wheels 31L and 31R are about to rotate by external force with the brake being released, the brake control circuit 100b detects the start of the rotation and the rotational direction of the respective wheels by the speed sensors 101L and 101R. Then, the brake control circuit 100b controls the operation switching circuits 102L and 102R so that the motors 41L and 41R are braked.

In the present embodiment, the control when the brake is released by operating the brake release switch 120F or 120T while the vehicle stops is the same as the control in the sixth embodiment. In the present embodiment, when the front wheel 31L and 31R are about to rotate in opposite directions with the brake being released, the brake control circuit 100b causes the wheels to keep rotating to turn the vehicle body, if the rotational direction is a direction in which the rotation is allowed. On the other hand, if the rotational direction is a direction in which the rotation is inhibited, the brake control circuit 100b switches the operation switching circuits 102L and 102R to performing braking to brake the front wheels 31L and 31R, thereby inhibiting the turn of the vehicle body.

Herein, a designer sets in advance which direction is set as the direction in which the rotation of the front wheels 31L and 31R is allowed when the brake release switch 120L mounted on the left side surface of the vehicle body is operated: a direction in which the vehicle body turns in a clockwise direction in a plan view; or a direction in which the vehicle body turns in a counterclockwise direction in a plan view. Which direction is set is determined based on whether the user operating the brake release switch 120L turns the autonomous vehicle 1 by pushing the side of the vehicle body or by pulling the side of the vehicle body.

Preferably, a corresponding handle is mounted near the brake release switches 120L and 120R. If the shape and arrangement of the handle are designed on a presupposition that the user pushes the vehicle body, a turning direction allowed when the brake release switch 120L on the left side surface of the vehicle body is operated is as stated below, for example. The allowed direction is a direction in which the rear wheels, which are omni wheels, move in the horizontal direction by pushing the left side surface of the vehicle body, that is, a direction in which the vehicle body turns in a counterclockwise direction in a plan view. More specifically, it is the direction in which the left front wheel 31L moves backward and the right front wheel 31R moves forward. The allowed direction when the brake release switch 120R on the right side surface of the vehicle body is pressed is a direction in which the vehicle body turns in a clockwise direction in a plan view. More specifically, it is the direction in which the left front wheel 31L moves forward and the right front wheel 31R moves backward. The rotation in the direction opposite to these directions is inhibited.

On the other hand, if the handle is designed on a presupposition that the user pulls the vehicle body, the turning direction allowed when the brake release switch 120L on the left side surface of the vehicle body is operated is as stated below, for example. The allowed direction is a direction in which the rear wheels, which are omni wheels, move in the horizontal direction by pulling the left side surface of the vehicle body, that is, a direction in which the vehicle body turns in a clockwise direction in a plan view. More specifically, it is the direction in which the left front wheel 31L moves forward and the right front wheel 31R moves backward. The allowed direction when the brake release switch 120R on the right side surface of the vehicle body is pressed is a direction in which the vehicle body turns in a counterclockwise direction in a plan view. More specifically, it is the direction in which the left front wheel 31L moves backward and the right front wheel 31R moves forward. The rotation in the direction opposite to these directions is inhibited.

According to this embodiment, when the brake release switch 120L is operated, the brake control circuit 100b allows the rotation of the wheels in which the vehicle body is turned by being pushed or pulled on the side of the vehicle body by the user, but inhibits the turn in the opposite direction. On the other hand, when the user moves the vehicle body forward by pushing the vehicle body from the bottom side of the slope, the rotation of the wheels in the forward direction is allowed, whereby the user is not exposed to danger even if he/she moves the vehicle body by oneself.

On the other hand, if it is presupposed that the user pulls and moves the vehicle body, the brake control circuit 100b allows the rotation of the wheels in a direction in which the vehicle body moves forward is allowed, but inhibits the rotation of the wheels in a direction in which the vehicle body moves backward, when the brake release switch 120F on the front part of the vehicle body is operated.

According to the present embodiment, even when the autonomous vehicle 1 stops on a steep slope, the rotation of the wheels in a direction in which the vehicle body is turned by being pushed or pulled on the side of the vehicle body by the user is allowed, but the rotation of the wheels in a direction in which the vehicle body is turned in the opposite direction is inhibited. Thus, the user is not exposed to danger even if he/she turns the vehicle body by oneself.

Ninth Embodiment

An autonomous vehicle 1 illustrated in FIG. 15 includes, near brake release switches 120F, 120T, 120L, and 120R on the front, rear, left, and right parts, handles 131F, 131T, 131L, and 131R (the handle 131R on the right side of the vehicle body is not illustrated in FIG. 15) gripped by a user to pull the vehicle body.

Due to the respective handles being provided near the corresponding brake release switches, the user is easy to pull the vehicle body of the autonomous vehicle 1 with force while operating any one of the brake release switches, and therefore, the user is easy to move or turn the vehicle body by oneself while operating the brake release switch without being exposed to danger.

In FIG. 15, handles and the corresponding brake release switches are mounted on the vehicle body of the autonomous vehicle 1. However, as a modification, all or some of the brake release switches and/or handles on the front, rear, left, and right parts may be mounted on a bumper. One of the corresponding brake switch and handle may be mounted on the vehicle body, and the other may be mounted on the bumper. However, it is preferable that both may be disposed close to each other.

Besides the embodiment illustrated in FIG. 15, a variety of shapes and forms are considered as another embodiment of the handle. For example, it is considered that a recess is formed on a portion of the vehicle body, and a user puts his/her hand on the recess to pull the vehicle body.

Figure 16:
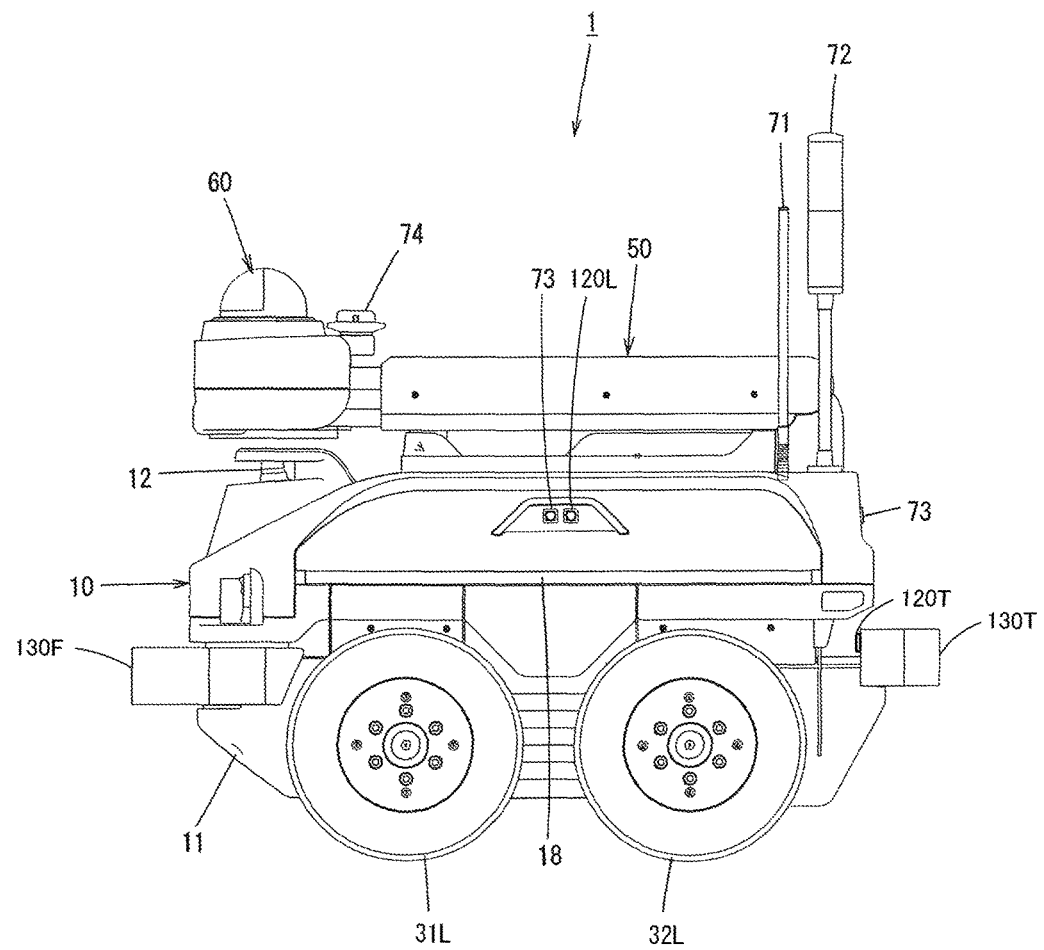
FIG. 16 is a left side view illustrating an embodiment of an autonomous vehicle, different from FIGS. 1 and 15, according to the present invention.

Still another modification is illustrated in FIG. 16. FIG. 16 illustrates that a bumper has a function of a handle. Specifically, a brake release switch 120T is mounted on a position where a rear bumper 130T faces the vehicle body. A user can pull the vehicle body by putting his/her hand between the rear bumper 130T and the vehicle body. The same is applied to the front part. A brake release switch 120F on the front part is mounted on a position where a front bumper 130F faces the vehicle body. It is to be noted that the brake release switch 120F is behind the front bumper 130F and not illustrated in FIG. 16.

As described above, (i) A motor-driven traveling device according to the present invention includes: a motor for travel driving that is capable of braking the vehicle body as a short brake or a dynamic brake; an electromagnetic brake that brakes the vehicle body, separately from the motor; an operation switching circuit that switches between causing the motor to perform travel driving and causing the motor to perform braking; a brake release switch that receives an operation pertaining to brake releasing of the motor and the electromagnetic brake; and a brake control circuit that, while the brake release switch is operated, controls the motor and the electromagnetic brake in response to the operation on the brake release switch.

In the present invention, the electromagnetic brake is a component that applies a brake to a traveling vehicle body, separately from braking by the motor for travel driving. A specific embodiment thereof includes an electromagnetic brake which releases a brake while being energized and applies a brake when energization thereto is stopped.

In addition, the motor is a drive source for allowing the vehicle body to travel. A specific embodiment thereof is a DC brush motor or a brushless motor using a battery as a power source. The short brake causes the motor to function as a brake in such a way that terminals of the motor are short-circuited to allow current to flow through windings of the motor, by which a shaft rotation of the motor is converted into electric energy which is consumed by a short circuit. The dynamic brake causes the motor to function as a brake in such a way that a resistor is connected between terminals of the motor and electric energy is consumed by a circuit by which current flows through windings and the resistor. In general, larger current flows in the short brake than in the dynamic brake, so that higher braking force is obtained by the short brake. On the other hand, in the dynamic brake, various braking forces are obtained by varying a resistance value of the resistor inserted between the motor terminals. It is to be noted that, in the short brake, various braking forces are also obtained by performing PWM control to switching elements of the motor driver, as in the dynamic brake.

In addition, the operation switching circuit is a circuit for switching between using the motor for travel driving of the vehicle body and using the motor for braking by the short brake or the like. A specific embodiment thereof is a bridge motor driver circuit, for example. If the motor is a DC brush motor, the operation switching circuit can be implemented by a full-bridge circuit, and if the motor is a three-phase brushless motor, the operation switching circuit can be implemented by a bridge inverter circuit.

The brake release switch is a switch for releasing the brake by energizing the above-mentioned electromagnetic brake.

The brake control circuit controls brake operations of the electromagnetic brake and the motor. A specific embodiment thereof is a control circuit using a computer, for example.

Further, preferable embodiments of the present invention will be described below.

(ii) The brake release switch may be a multistage switch that performs at least two-step switching according to an operation amount of the brake release switch, and the brake control circuit may release a brake by the electromagnetic brake and perform braking by the motor, in response to a first-step operation on the brake release switch, and may release the braking by the motor in response to a final-step operation.

According to this configuration, by the first-step operation on the brake release switch, a brake by the electromagnetic brake is released and braking by the motor is performed, whereby a user safely releases the brake by suppressing an unexpected movement of the vehicle body when releasing the electromagnetic brake.

(iii) The brake release switch may be a multistage switch that performs at least three-step switching, and the brake control circuit may control so that braking force by the motor is lowered as an operation amount of the brake release switch proceeds from a first step.

According to this configuration, braking force by the motor is lowered as an operation amount of the brake release switch proceeds from the first step toward a final step, whereby a user can gradually release the brake while adjusting an operation amount of the switch. Accordingly, the user can safely release the brake by suppressing an unexpected movement of the vehicle body.

(iv) The brake control circuit may control a time average of a magnitude of current flowing through the motor to control braking force.

According to this configuration, the strength of braking force can be adjusted by varying average current.

(v) The brake control circuit may release a brake by the electromagnetic brake and perform braking by the motor, in response to an operation on the brake release switch, the brake control circuit lowering braking force by the motor in a stepwise manner with time.

According to this configuration, a user can gradually release the brake without using a multistage switch for the brake release switch. Accordingly, the user can safely release the brake by suppressing an unexpected movement of the vehicle body.

(vi) The traveling device may further include an inclination sensor that detects an inclination degree of the vehicle body in a traveling direction, wherein the brake control circuit may control so that braking force by the motor is increased with an increase in the inclination degree of the vehicle body detected by the inclination sensor.

According to this configuration, when the vehicle body stops on a slope, the vehicle body, which is more likely to move down the slope with an increase in an inclination degree of the vehicle body in a traveling direction, is suppressed with high braking force. Accordingly, a user can safely release the brake by suppressing an unexpected movement of the vehicle body.

(vii) The brake release switch may be a self-reset switch provided on at least a front part and a rear part of the vehicle body, and the brake control circuit may control the motor and the electromagnetic brake in response to an operation received by any of the brake release switches.

According to this configuration, the brake release switch is provided on both a front part and a rear part of the vehicle body. Thus, when the vehicle body stops on a slope, a user operates the brake release switch on the top side of the slope, thereby being capable of safely releasing the brake.

(viii) The brake release switch may be composed of a plurality of switches including at least a first switch and a second switch, and the brake control circuit may release a brake by the electromagnetic brake and perform braking by the motor, in response to an operation received by the first switch, and then, may release the braking by the motor in response to an operation received by the second switch.

In this case, it is preferable that an on state and an off state of each switch is visually recognizable. According to this configuration, the operation in each step for brake releasing is performed by different switches, so that, when a plurality of persons moves the traveling device by hands in cooperation, each person can move the traveling device by hands by releasing the brake, while confirming the step of the operation for brake releasing by seeing the state of each switch.

(ix) The brake release switch may be provided respectively on different positions corresponding to a plurality of directions in which the vehicle body is movable, and the brake control circuit may release a brake and limit a direction in which the vehicle is movable, according to which one of the brake release switches is operated.

For example, when a user pushes and moves the vehicle body on a slope in an upward direction from the bottom side of the slope, if brakes of all wheels are released through the depression of the brake release switch, the vehicle body is about to move down the slope by its own weight, so that the user is at a risk of getting run over by the vehicle body which is moving down the slope.

According to the configuration described above, when the brake release switch corresponding to an upward direction is operated, the brake control circuit controls so that the movement of the vehicle body in a downward direction is inhibited but the vehicle body is movable in the upward direction. Thus, even when the user pushes and moves the vehicle body, which has stopped on a slope, in the upward direction from the bottom side of the slope, for example, the user can safely and smoothly move the vehicle body, and it is not dangerous for the user to move the vehicle body by oneself.

(x) The traveling device may further include a wheel that allows the vehicle body to travel and a speed sensor that detects a rotational speed and a rotational direction of the wheel, wherein the brake release switch may be provided on at least a front part and a rear part of the vehicle body, respectively, and when the drive of the motor is stopped, a brake may be released due to an operation on any one of the brake release switches, and the wheel is about to rotate, the brake control circuit may control such that a rotation of the wheel in a direction in which the vehicle body moves forward is inhibited and only a backward movement of the vehicle body is allowed, if the brake release switch on the front part is operated, and a rotation of the wheel in a direction in which the vehicle body moves backward is inhibited and only a forward movement of the vehicle body is allowed, if the brake release switch on the rear part is operated; or the brake control circuit may control such that a rotation of the wheel in a direction in which the vehicle body moves backward is inhibited and a forward movement of the vehicle body is only allowed, if the brake release switch on the front part is operated, and a rotation of the wheel in a direction in which the vehicle body moves forward is inhibited and a backward movement of the vehicle body is only allowed, if the brake release switch on the rear part is operated.

According to the configuration described above, the brake control circuit allows only the movement of the vehicle body in a direction opposite to the brake release switch which has been operated, for example. Specifically, when the brake release switch on the rear part is operated, the forward movement of the vehicle body is allowed, and the backward movement is inhibited. Therefore, when a user pushes and moves forward the vehicle body on a slope from the bottom side of the slope, the backward movement of the vehicle body is inhibited and the vehicle can move forward in only an upward direction. However, during the period from when the rotation of the wheel is detected till braking by the motor is performed, the vehicle body may slightly move down on the slope. According to the configuration described above, the user can safely and smoothly move the vehicle body, which has stopped on a slope, for example, and it is not dangerous for the user to move the vehicle body by oneself.

On the other hand, it is considered that the user moves the vehicle body by pulling the vehicle body, not by pushing the vehicle body. When it is supposed that the user moves the vehicle body by pulling the vehicle body, the brake control circuit may control so that only the movement of the vehicle body toward the brake release switch which has been operated is allowed.

Whether to use an assumption that the user pushes and moves the vehicle body or an assumption that the user pulls and moves the vehicle body is a matter determined by a designer.

(xi) The brake release switch may be further provided on a left side and a right side of the vehicle body, respectively, and when the drive of the motor is stopped, the brake may be released due to an operation on any one of the brake release switches, and the wheel is about to rotate, the brake control circuit may control such that a rotation of the wheel in either one of a direction in which the vehicle body is turned by being pushed on the right side of the vehicle body or a direction in which the vehicle body is turned by being pulled on the right side of the vehicle body is only allowed, and a rotation of the wheel in the opposite direction is inhibited, if the brake release switch on the right side of the vehicle body is operated; and the brake control circuit may control such that a rotation of the wheel in either one of a direction in which the vehicle body is turned by being pushed on the left side of the vehicle body or a direction in which the vehicle body is turned by being pulled on the left side of the vehicle body is only allowed, and a rotation of the wheel in the opposite direction is inhibited, if the brake release switch on the left side of the vehicle body is operated.

According to this configuration, when not only moving forward or backward the vehicle body but also turning the vehicle body, a user can safely and smoothly turn the vehicle body which has stopped on a slope, for example, and it is not dangerous for the user to move the vehicle body by oneself.

(xii) The brake control circuit may inhibit a rotation of the wheel by braking using the motor.

(xiii) The traveling device may further include: a bumper that protects the vehicle body from collision; and a handle that is mounted on the vehicle body or the bumper for moving the vehicle body by being pushed or pulled by a user, wherein the brake release switch may be provided on the handle or near the handle.

According to this configuration, a user can easily move the vehicle body by gripping the handle to apply force. In addition, since the brake release switch is disposed near the handle, the user can easily and safely move the vehicle body by oneself by gripping the handle, while operating the brake release switch.

(xiv) The traveling device may further include a bumper that is disposed outside the vehicle body to protect the vehicle body from collision, wherein the brake release switch may be provided close to the vehicle body on the bumper.

According to this configuration, a user can easily move the vehicle body by gripping and pulling the bumper. In addition, since the brake release switch is disposed closer to the vehicle body on the bumper, the user can easily and safely move the vehicle body by oneself by gripping the bumper, while operating the brake release switch.

Preferable embodiments of the present invention include an embodiment formed by combining any of the embodiments described above.

Various modifications are possible for the present invention, in addition to the above-mentioned embodiment. Such modifications should not be deemed to be out of the scope of the present invention. The present invention should include all the modifications within the scope of the claims, their equivalents, and within the above scope.

What is claimed is:

1. A motor-driven traveling device comprising:
a vehicle body;
a motor for travel driving that is capable of braking the vehicle body as a short brake or a dynamic brake;
an electromagnetic brake that brakes the vehicle body, separately from the motor;
an operation switching circuit that switches between causing the motor to perform travel driving and causing the motor to perform braking;
a brake release switch that receives an operation pertaining to brake releasing of the motor and the electromagnetic brake; and
a brake control circuit that, while the brake release switch is operated, controls the motor and the electromagnetic brake in response to the operation on the brake release switch.

2. The traveling device according to claim 1, wherein
the brake release switch is a multistage switch that performs at least two-step switching according to an operation amount of the brake release switch, and
the brake control circuit releases a brake by the electromagnetic brake and performs braking by the motor, in response to a first-step operation on the brake release switch, and releases the braking by the motor in response to a final-step operation.

3. The traveling device according to claim 1, wherein
the brake release switch is a multistage switch that performs at least three-step switching, and
the brake control circuit controls so that braking force by the motor is lowered as an operation amount of the brake release switch proceeds from a first step.

4. The traveling device according to claim 3, wherein
the brake control circuit controls a time average of a magnitude of current flowing through the motor to control braking force.

5. The traveling device according to claim 1, wherein
the brake control circuit releases a brake by the electromagnetic brake and performs braking by the motor, in response to an operation on the brake release switch, the brake control circuit lowering braking force by the motor in a stepwise manner with time.

6. The traveling device according to claim 1, further comprising an inclination sensor that detects an inclination degree of the vehicle body in a traveling direction, wherein
the brake control circuit controls so that braking force by the motor is increased with an increase in the inclination degree of the vehicle body detected by the inclination sensor.

7. The traveling device according to claim 1, wherein
the brake release switch is a self-reset switch provided on at least a front part and a rear part of the vehicle body, and
the brake control circuit controls the motor and the electromagnetic brake in response to an operation received by any of the brake release switches.

8. The traveling device according to claim 1, wherein
the brake release switch is composed of a plurality of switches including at least a first switch and a second switch, and
the brake control circuit releases a brake by the electromagnetic brake and performs braking by the motor, in response to an operation received by the first switch, and then, releases the braking by the motor in response to an operation received by the second switch.

9. The traveling device according to claim 1, wherein
the brake release switch is provided respectively on different positions corresponding to a plurality of directions in which the vehicle body is movable, and
the brake control circuit releases a brake and limits a direction in which the vehicle is movable, according to which one of the brake release switches is operated.

10. The traveling device according to claim 9, further comprising a wheel that allows the vehicle body to travel and a speed sensor that detects a rotational speed and a rotational direction of the wheel, wherein
the brake release switch is provided on at least a front part and a rear part of the vehicle body, respectively, and
when the drive of the motor is stopped, a brake is released due to an operation on any one of the brake release switches, and the wheel is about to rotate, the brake control circuit controls such that a rotation of the wheel in a direction in which the vehicle body moves forward is inhibited and only a backward movement of the vehicle body is allowed, if the brake release switch on the front part is operated, and a rotation of the wheel in a direction in which the vehicle body moves backward is inhibited and only a forward movement of the vehicle body is allowed, if the brake release switch on the rear part is operated; or the brake control circuit controls such that a rotation of the wheel in a direction in which the vehicle body moves backward is inhibited and a forward movement of the vehicle body is only allowed, if the brake release switch on the front part is operated, and a rotation of the wheel in a direction in which the vehicle body moves forward is inhibited and a backward movement of the vehicle body is only allowed, if the brake release switch on the rear part is operated.

11. The traveling device according to claim 10, wherein
the brake release switch is further provided on a left side and a right side of the vehicle body, respectively, and when the drive of the motor is stopped, the brake is released due to an operation on any one of the brake release switches, and the wheel is about to rotate, the brake control circuit controls such that a rotation of the wheel in either one of a direction in which the vehicle body is turned by being pushed on the right side of the vehicle body or a direction in which the vehicle body is turned by being pulled on the right side of the vehicle body is only allowed, and a rotation of the wheel in the opposite direction is inhibited, if the brake release switch on the right side of the vehicle body is operated; and the brake control circuit controls such that a rotation of the wheel in either one of a direction in which the vehicle body is turned by being pushed on the left side of the vehicle body or a direction in which the vehicle body is turned by being pulled on the left side of the vehicle body is only allowed, and a rotation of the wheel in the opposite direction is inhibited, if the brake release switch on the left side of the vehicle body is operated.

12. The traveling device according to claim 9, wherein the brake control circuit inhibits a rotation of the wheel by braking using the motor.

13. The traveling device according to claim 1, further comprising:
   a bumper that protects the vehicle body from collision; and
   a handle that is mounted on the vehicle body or the bumper for moving the vehicle body by being pushed or pulled by a user,
   wherein the brake release switch is provided on the handle or near the handle.

14. The traveling device according to claim 1, further comprising
   a bumper that is disposed outside the vehicle body to protect the vehicle body from collision,
   wherein the brake release switch is provided close to the vehicle body on the bumper.

\* \* \* \* \*